United States Patent
Fischer et al.

(10) Patent No.: US 10,836,951 B2
(45) Date of Patent: Nov. 17, 2020

(54) METHOD FOR PRODUCING POLYMERS ON THE BASIS OF ACRYLOYLDIMETHYLTAURATE, NEUTRAL MONOMERS, AND MONOMERS WITH CARBOXYLATE GROUPS

(71) Applicant: Clariant International Ltd., Muttenz (CH)

(72) Inventors: Dirk Fischer, Hahnheim (DE); Christoph Kayser, Mainz (DE); Claudia Diemel, Gelnhausen (DE); Katharina Berz, Seligenstadt (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 15/737,075

(22) PCT Filed: May 31, 2016

(86) PCT No.: PCT/EP2016/062285
§ 371 (c)(1),
(2) Date: Dec. 15, 2017

(87) PCT Pub. No.: WO2016/202578
PCT Pub. Date: Dec. 22, 2016

(65) Prior Publication Data
US 2018/0171208 A1    Jun. 21, 2018

(30) Foreign Application Priority Data
Jun. 17, 2015 (EP) .................................. 15001793

(51) Int. Cl.
| | | |
|---|---|---|
| C09K 8/508 | (2006.01) | |
| C04B 24/24 | (2006.01) | |
| C04B 28/02 | (2006.01) | |
| C08F 220/56 | (2006.01) | |
| C08F 220/58 | (2006.01) | |
| C09K 8/487 | (2006.01) | |
| C09K 8/035 | (2006.01) | |
| C04B 24/16 | (2006.01) | |
| C08L 33/26 | (2006.01) | |
| C09K 8/24 | (2006.01) | |

(52) U.S. Cl.
CPC .......... *C09K 8/5083* (2013.01); *C04B 24/163* (2013.01); *C04B 24/243* (2013.01); *C04B 28/02* (2013.01); *C08F 220/56* (2013.01); *C08F 220/58* (2013.01); *C08L 33/26* (2013.01); *C09K 8/035* (2013.01); *C09K 8/487* (2013.01); *C08F 220/585* (2020.02); *C09K 8/24* (2013.01)

(58) Field of Classification Search
None
See application file for complete search history.

(56) References Cited

U.S. PATENT DOCUMENTS

| | | | |
|---|---|---|---|
| 2,798,053 | A | 7/1957 | Brown |
| 4,555,269 | A | 11/1985 | Rao |
| 5,025,040 | A | 6/1991 | Crema |
| 5,373,044 | A | 12/1994 | Adams |
| 5,472,051 | A | 12/1995 | Brothers |
| 7,151,137 | B2 | 12/2006 | Morschhaeuser |
| 2004/0097657 | A1 | 5/2004 | Morschhaeuser |
| 2012/0095120 | A1 | 4/2012 | Braun |
| 2012/0100084 | A1* | 4/2012 | Peter ................. A61K 8/36 424/59 |
| 2018/0155478 | A1* | 6/2018 | Kayser .............. C09K 8/508 |
| 2018/0171207 | A1* | 6/2018 | Fischer ............. C04B 24/383 |

FOREIGN PATENT DOCUMENTS

| | | |
|---|---|---|
| EP | 0116671 | 8/1984 |
| EP | 0157055 | 10/1985 |
| EP | 0217608 | 4/1987 |
| EP | 301532 | 2/1989 |
| EP | 816403 | 1/1998 |
| EP | 1033378 | 9/2000 |
| EP | 1045869 | 10/2000 |
| EP | 1059316 | 12/2000 |
| EP | 1069142 | 1/2001 |
| EP | 1116733 | 7/2001 |
| EP | 2227498 | 9/2010 |
| WO | 9926991 | 6/1999 |
| WO | 0244268 | 6/2002 |
| WO | 2007059857 | 5/2007 |
| WO | 2009083130 | 7/2009 |
| WO | 2010108634 | 9/2010 |
| WO | 2012119746 | 9/2012 |
| WO | 2012119747 | 9/2012 |

OTHER PUBLICATIONS

"The synthesis and performance characterization of the AMPS / AM /AA terpolymer as a temperature-resistance, salt-loerance fluid loss additive", Guo Jintang et al, Acta Petrolei Sinica, vol. 32, No. 3, pp. 470-473. (9 pages.).
International Search Report for PCT/EP2016/062285, dated Jul. 14, 2016, 3 pages.

* cited by examiner

*Primary Examiner* — John J Figueroa
(74) *Attorney, Agent, or Firm* — Tod A. Waldrop

(57) ABSTRACT

The invention relates to a method for producing water-soluble or water-swellable polymers containing acryloyldimethyltaurate, neutral monomers, and monomers with carboxylate groups. The monomers undergo free radical polymerisation in precipitation in a polar solvent or solvent mixture, providing that an additional polar organic solvent is contained if the polar solvent contains 2-methyl-2-propanol, a ketone or both.

14 Claims, No Drawings

METHOD FOR PRODUCING POLYMERS ON THE BASIS OF ACRYLOYLDIMETHYLTAURATE, NEUTRAL MONOMERS, AND MONOMERS WITH CARBOXYLATE GROUPS

The present invention relates to a process for preparing water-soluble or water-swellable polymers based on sulfonic acids, phosphonic acids or salts thereof, uncharged monomers and monomers having carboxylate anions, and to the use of these polymers as water loss reducers in cement slurries for cementing deep wells and as additive in drilling muds in deep wells for reduction of water loss at the well wall.

In the case of deep wells for exploitation of mineral oil and natural gas deposits, it is necessary to use drilling muds and cement slurries. During the drilling operation, what are called drilling muds are used, the tasks of which include conveying the drillings to the surface and cooling the drill head. During the drilling operation, the well can pass through porous rock layers. As a result, there can be release of water from the drilling mud to the porous rock. In order to prevent this, additives such as water loss reducers, called "fluid loss additives", are used.

Once the well has reached a particular depth, what are called casing tubes are introduced into the well. For this purpose, the casing tubes have to be fixed, meaning that a cement slurry is pumped into the cavity between the rock and the casing tubes, and solidifies to give a solid rock. The release of water from the cement slurry to the porous rock during the pumping operation should be low, in order that there is no thick filtercake formed at the well wall, which would increase the pumping pressure owing to the annular space constriction to such an extent that the porous rock will break up. Moreover, the cement slurry would not set in an optimal manner in the case of excessive water release and would become permeable to gas and oil. On the other hand, the cement mantle that forms in the annular space must attain adequate strength very quickly and no shrinkage, resulting in flow channels for gas, oil and water, must occur in the course of setting. Optimal adjustment of the properties of the cement slurry is only possible by means of additives. The most important additives are retardants, accelerators, dispersants and water loss reducers.

Synthetic polymers based on the monomer acryloyldimethyltaurate have been found to be effective water loss reducers in drilling muds and have become particularly established as water loss reducers in cement and gypsum slurries.

U.S. Pat. No. 5,472,051 describes polymers formed from acryloyldimethyltaurate and acrylic acid with molecular weights of less than 5000 g/mol and the use thereof as water loss reducers.

EP 1045869 describes polymers formed from acryloyldimethyltaurate and acrylamide and the use thereof as water loss reducers. These polymers are prepared with the aid of a precipitation polymerization as the ammonium salt of acryloyldimethyltaurate in tert-butanol. The preparation of a sodium salt is not described or not possible (comparative example 1).

EP 0116671 discloses the introduction of 5%-60% by weight of vinylamides (e.g. N-vinylmethylacetamide) in acryloyldimethyltaurate-containing polymers. It was thus possible to significantly extend the high temperature-range of use.

U.S. Pat. No. 5,025,040 describes polymers formed from acryloyldimethyltaurate, acrylamide and at least 20% N-vinylimidazole.

EP 0217608, U.S. Pat. No. 4,555,269 and EP 0157055 describe a copolymer formed from acryloyldimethyltaurate and dimethylacrylamide in a molar ratio of 1:4 to 4:1 as fluid loss additive for saline (about 10% by weight) cement slurries and the use of acryloyldimethyltaurate and acrylic acid in a molar ratio of 1:4 to 4:1 for the same purpose.

EP 0816403 teaches water-soluble or water-swellable polymers containing, in random distribution, 90% to 99.99% by weight of radicals of the formula (1)

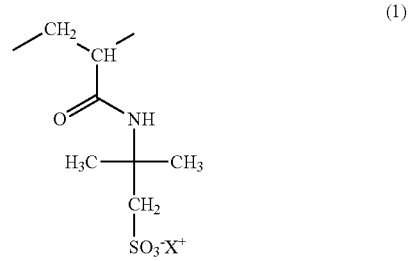

and 0.01% to 10% by weight of crosslinking structures that have originated from monomers having at least two olefinic double bonds, where $X^+$ is a cation or a mixture of cations and $X^+$ must not consist of protons ($H^+$) to an extent of more than 10 mol %, and where the number of radicals of the formula (1) in the polymer must be sufficiently high that the hydrodynamic volume of the polymers in aqueous solution has a radius of 10 to 500 nm and a homogeneous, unimodal distribution, and the use thereof for thickening liquids.

WO 2010/108634 teaches a water-soluble or water-swellable polymer containing a) 20.0 to 98.99 mol % of one or more mutually independent repeat structural units of the formula (1)

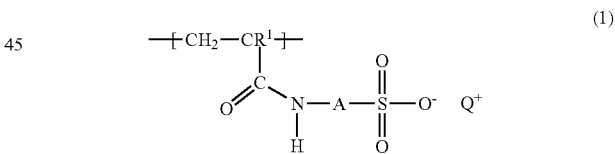

in which $R^1$ is hydrogen, methyl or ethyl,

A is linear or branched $C_1$-$C_{12}$-alkylene, preferably $C_1$-$C_8$-alkylene, and $Q^+$ is $H^+$, $NH_4^+$, organic ammonium ions $[HNR^5R^6R^7]^+$ where $R^5$, $R^6$ and $R^7$ may independently be hydrogen, a linear or branched alkyl group having 1 to 22 carbon atoms, a linear or branched, mono- or polyunsaturated alkenyl group having 2 to 22 carbon atoms, a $C_6$-$C_{22}$-alkylamidopropyl group, a linear monohydroxyalkyl group having 2 to 10 carbon atoms or a linear or branched dihydroxyalkyl group having 3 to 10 carbon atoms, and where at least one of the $R^5$, $R^6$ and $R^7$ radicals is not hydrogen, $Li^+$, $Na^+$, $K^+$, $½Ca^{++}$, $Mg^{++}$, $½ Zn^{++}$ or $⅓ Al^{+++}$ or is mixtures of these ions, and b) 1.0 to 79.99 mol % of one or more mutually independent repeat structural units of the formula (2)

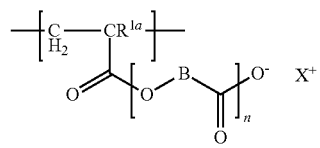

(2)

in which $R^{1a}$ is hydrogen, methyl or ethyl, $X^+$ is $H^+$, $NH_4^+$, organic ammonium ions $[HNR^5R^6R^7]^+$ where $R^5$, $R^6$ and $R^7$ may independently be hydrogen, a linear or branched alkyl group having 1 to 22 carbon atoms, a linear or branched, mono- or polyunsaturated alkenyl group having 2 to 22 carbon atoms, a $C_6$-$C_{22}$-alkylamidopropyl group, a linear monohydroxyalkyl group having 2 to 10 carbon atoms or a linear or branched dihydroxyalkyl group having 3 to 10 carbon atoms, and where at least one of the $R^5$, $R^6$ and $R^7$ radicals is not hydrogen, $Li^+$, $Na^+$, $K^+$, $½ Ca^{++}$, $Mg^{++}$, $½ Zn^{++}$ or $⅓ Al^{+++}$ or is mixtures of these ions, B is a linear or branched alkylene group having 1 to 6 carbon atoms, and n is an integer from 1 to 10, and c) 0.01 to 8.0 mol %, preferably 0.01 to 5.0 mol %, more preferably 0.01 to 2.0 mol % and especially preferably 0.25 to 1.5 mol % of one or more mutually independent crosslinking structural units that have originated from one or more monomers having at least two olefinic double bonds, and the use thereof as thickener, bodying agent, emulsifier, sensory additive, solubilizer, dispersant, lubricant, bonding agent, stabilizer or yield point former, preferably as thickener, bodying agent or yield point former, more preferably as thickener or yield point former and especially preferably as yield point former, exceptionally preferably in cosmetic, dermatological or pharmaceutical compositions.

EP 1059316 teaches copolymers containing

A) 5%-95% by weight of structural units that derive from compounds of the formula (1)

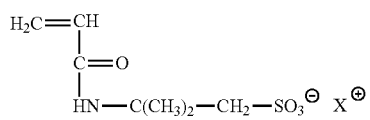

(1)

B) 1% to 95% by weight of structural units that derive from compounds of the formula (2)

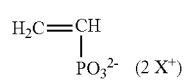

(2)

and

C1) 1% to 95% by weight of structural units that derive from compounds of the formula (3)

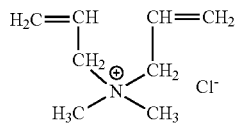

(3)

or, as an alternative to C1),

C2) 1% to 95% by weight of structural units that derive from compounds of the formula (4)

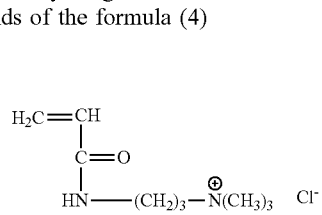

(4)

in which X is a cation, and the use thereof for reducing water loss from well cementations, drilling muds and completion and cleanout fluids.

EP 1059316 describes the use of polymers containing acryloyldimethyltaurate, vinylphosphonic acid and cationic monomers, the preparation thereof and use as water loss reducers.

The synthetic poly(acryloyldimethyltaurate) copolymers can be obtained in two different physical forms in industrial production, as powder and in liquid form. The liquid form is understood to mean polymer solutions, for example polymer emulsions or dispersions, in which the polymer is present dissolved in a solvent or dispersed through the use of an emulsifier.

Poly(acryloyldimethyltaurate) copolymers in powder form have recently been described in U.S. Pat. Nos. 5,373,044, 2,798,053, EP 1045869, EP 301532, EP 816403, EP 1116733 and EP 1069142. All these polymers based on acryloyldimethyltaurate are obtained with the aid of a precipitation polymerization. This involves initially charging the monomers used in an organic solvent, such as toluene, ethyl acetate, hexane, cyclohexane, ethanol or 2-methylpropan-2-ol. The disadvantage of these organic solvents is usually that the acryloyldimethyltaurate does not dissolve completely therein, the result being excessively high residual monomer contents of the monomer units obtained after the polymerization.

Moreover, the molar masses obtained are usually not high, since the polymer becomes insoluble in the solvent too quickly during the polymerization.

Poly(acryloyldimethyltaurate) copolymers which have been prepared with the aid of a precipitation polymerization have the advantage compared to inverse emulsion polymerization that no residues of oil and the emulsifiers are present in the final product. Some of the oils used and the emulsifiers used in the polymerization processes mentioned can cause skin irritation. Moreover, the polymers which have been prepared with the aid of an inverse emulsion polymerization usually have the disadvantage that the oil present in the polymer from the process leads to cloudiness in aqueous polymer solutions.

WO 2010/108634, WO 2012/119747, WO 2012/119746, EP 1045869, EP 0816403, EP 2227498, U.S. Pat. No.

7,151,137 and WO 0244268 describe, inter alia, processes for preparing poly(acryloyldimethyltaurate) copolymers with the aid of a precipitation polymerization in 2-methylpropan-2-ol.

The use of 2-methylpropan-2-ol or 2-methylpropan-2-ol/water mixtures makes it necessary to neutralize the acryloyldimethyltaurate with gaseous ammonia or an ammonium salt, since these are the only salts of acryloyldimethyltaurate that have sufficient solubility in 2-methylpropan-2-ol for polymers of the desired molecular weight to form. The low solubility of these alkali metal or alkaline earth metal salts of poly(acryloyldimethyltaurate) copolymers has an adverse effect on the molecular weight of the polymers obtained and the performance thereof.

EP 1033378 describes a process for preparing poly(acryloyldimethyltaurate) copolymer ammonium salt in 2-methylpropan-2-ol. The polymers prepared were used in barite-weighted seawater drilling muds with 3% KCl and a specific weight of 2.1 kg/L (comparative examples 2 and 3).

The use of ammonium salts of the poly(acryloyldimethyltaurate) copolymers in cement slurries or alkaline drilling muds, because of the high pH values (pH>10) that exist, has the crucial drawback of resulting in the release of ammonia gas. As a result, an unpleasant, irritating odor is perceived at the site of use, which is caused by the release of toxic ammonia into the environment. It necessitates special technical equipment in order, for example, to rule out endangerment of personnel or the release of this gas into the environment. The unwanted release of ammonia gas likewise hinders the use of gas sensors in mineral oil and natural gas drilling plants.

It was therefore an object of the present invention to provide a process for preparing polymers and copolymers of acryloyldimethyltaurate, with the aid of which the metal salts, preferably alkali metal and alkaline earth metal salts, of these polymers and copolymers are preparable directly. These polymers and copolymers are to exhibit improved performance in use as a water loss reducer in cement slurries or as additive in drilling muds. In the use thereof, there is no release of ammonia, as was typical of prior art water loss reducers.

It has now been found that, surprisingly, linear or branched polymers or copolymers of acryloyldimethyltaurate which, as metal salts, preferably alkali metal or alkaline earth metal salts, are free of ammonium salts, can be prepared with the aid of a process, by polymerizing the acryloyldimethyltaurate as a neutralized metal salt, preferably alkali metal salt or alkaline earth metal salt, especially preferably as sodium salt.

The present invention provides a process for preparing water-soluble or water-swellable polymers containing a) 5 to 79.99 mol %, preferably from 12.5 to 69.75 mol %, of one or more repeat structural units of the formula (1)

$$\begin{array}{c} -\!\!\!+\!\!CH_2-CR^1\!\!+\!\!- \\ | \\ Y \quad O \\ | \quad \| \\ A-D \\ | \\ O^- \quad Q^+ \end{array} \quad (1)$$

in which
$R^1$, $R^2$, $R^3$ is hydrogen, methyl or ethyl,
Y is a chemical bond, O, $CH_2$, $C(CH_3)H$, $C(O)O$, $C(O)$, $C(O)NR^2$, A is a chemical bond, O, arylene, phenylene, linear or branched $C_1$-$C_{12}$-alkylene, a linear monohydroxyalkylene group having 2 to 6 carbon atoms or a linear or branched dihydroxyalkylene group having 3 to 6 carbon atoms,
D is $S(O)$, POH, $POR^3$ or $PO^-Q^+$,
$Q^+$ is $H^+$, $Li^+$, $Na^+$, $K^+$, ½ $Ca^{++}$, ½ $Mg^{++}$, ½ $Zn^{++}$, ⅓ $Al^{+++}$, ¼ $Zr^{++++}$ or is mixtures of these ions, b) 20 to 75 mol %, preferably 30 to 72.5 mol % of one or more mutually independent uncharged repeat structural units, and
c) 0.01 to 20 mol %, preferably from 0.25 to 15 mol %, of one or more further anionic repeat structural units that have originated from one or more monomers having at least one carboxylate group, which comprises subjecting monomers from which the structural units a) to c) derive to precipitative free-radical polymerization in a polar solvent or solvent mixture, with the proviso that, when the polar solvent or solvent mixture comprises 2-methyl-2-propanol, a ketone or both, a second polar organic solvent must be present.

The monomers that result in the structural units a), in one embodiment, are used in the form of $Li^+$, $Na^+$, $K^+$, $Ca^{++}$, $Mg^{++}$, $Zn^{++}$, $Al^{+++}$, $Zr^{++++}$ salts. In another embodiment, they are neutralized prior to the polymerization, or the polymer is neutralized after the polymerization, with an $Li^+$—, $Na^+$—, $K^+$—, $Ca^{++}$—, $Mg^{++}$—, $Zn^{++}$—, $Al^{+++}$- or $Zr^{++++}$-containing base, preferably with the corresponding hydroxides, hydrogencarbonates and carbonates.

The polymers prepared by the process of the invention are referred to hereinafter as "polymer C" or as "polymers C".

The weight-average molecular weights of the polymers C are preferably 300 000 to 5 000 000, preferably 500 000 to 4 000 000 and especially 600 000 to 2 500 000 g/mol. The weight-average molecular weights can be determined with the aid of gel permeation chromatography (GPC). The procedure for determination of the weight-average molecular weight with the aid of GPC is described in detail in chapter 3 in "Makromolekulare Chemie: Eine Einführung" [Macromolecular Chemistry: an Introduction] by Bernd Tieke, Wiley-VCH, second fully revised and extended edition (Sep. 9, 2005) ISBN-10: 3527313796. The polymers C are analyzed against a polystyrenesulfonate standard.

Indicators used for the molecular weight are the relative viscosity or the k value. To determine the k value, the polymer C is dissolved in distilled water in a concentration of 0.5% by weight, and the outflow time at 20° C. is determined by means of an Ubbelohde viscometer. This value gives the absolute viscosity of the solution ($\eta_c$). The absolute viscosity of the solvent is ($\eta_0$). The ratio of the two absolute viscosities gives the relative viscosity:

$$Z = \frac{n_c}{n_0}$$

The relative viscosity Z and the concentration C can be used to calculate the k value by means of the following equation:

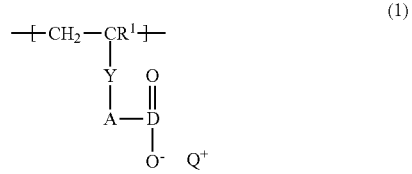

$$Lg\, z = \left(\frac{75*k^2}{1+1.5kc} + k\right)*c$$

The k value of the polymers C is preferably from 100 to 300, further preferably from 150 to 270 and especially preferably from 180 to 250.

It is possible for various structural units of the formula (1) or of component b) to be present in each case in the polymers C. A polymer C may contain, for example, two or more structural units that derive from polymerizable sulfonic acids or phosphonic acids of the formula (1). A further polymer C may, for example, also contain two or more uncharged structural units of component b) which differ, for example, by different $R^1$ radicals. A further polymer C may, for example, also contain two or more further anionic structural units of component c) which differ by a different number of carboxylate anions. References to structural units a) or b) should always be understood hereinafter such that they describe either the case of one such structural unit or the case of two or more such structural units.

The structural units of the formula (1) of the polymers C are preferably derived from monomers from the group consisting of acryloyldimethyltaurate, acryloyl-1,1-dimethyl-2-methyltaurate, acryloyltaurate, acryloyl-N-methyltaurate, 3-allyloxy-2-hydroxy-1-propanesulfonic acid, vinylsulfonic acid, styrenesulfonic acid, vinylphosphonic acid, 2-acrylamido-2-methylpropanephosphonic acid, especially preferably acryloyldimethyltaurate, vinylsulfonic acid, vinylphosphonic acid and styrenesulfonic acid.

Preferably, the neutralization level of the structural units of the formula (1) of the polymers C is from 50.0 to 100 mol %, more preferably from 80.0 to 100 mol %, especially preferably from 90.0 to 100 mol % and exceptionally preferably from 95.0 to 100 mol %.

In the structural units of the formula (1) of the polymers C, the counterion $Q^+$ which is different than $H^+$ is preferably an alkali metal ion, of which $Na^+$ is preferred, an alkaline earth metal ion or mixtures of these ions. More preferably, the counterion Q which is different than $H^+$ is $Na^+$.

The mutually independent uncharged repeat structural units b) preferably derive from functionalized acrylic or methacrylic esters, acrylamides or methacrylamides, polyglycol acrylates or methacrylates, polyglycol acrylamides or methacrylamides, dipropylene glycol acrylates or methacrylates, dipropylene glycol acrylamides or methacrylamides, ethoxylated fatty alcohol acrylates or methacrylates, propoxylated fatty alcohol acrylates or linear or cyclic N-vinylamides or N-methvinyl amides.

The structural units of component b) preferably derive from monomers of the formula (2)

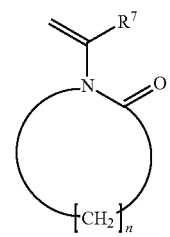

(2)

in which
$R^4$, $R^5$, $R^6$ is a linear or branched alkyl group having 1 to 6 carbon atoms.

Particularly preferred structural units of the formula (2) are derived from monomers from the group consisting of N-vinylformamide, N-vinylacetamide, N-methyl-N-vinylformamide, N-methyl-N-vinylacetamide.

Further preferably, structural units of component b) derive from monomers of the formula (3)

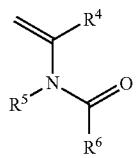

(3)

in which
$R^7$ is hydrogen, methyl or ethyl, and
n is an integer of 3-5.

Particularly preferred structural units of the formula (3) are derived from monomers from the group consisting of N-vinyl-2-pyrrolidone (NVP) and N-vinylcaprolactam.

In a further preferred embodiment of the polymers C, the structural units of component b) derive from monomers of the formula (4)

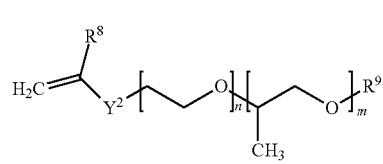

(4)

in which
$R^8$ is hydrogen, methyl or ethyl,
$R^9$ is H, a linear or branched alkyl group having 1 to 50 carbon atoms, a linear or branched monohydroxyalkyl group having 2 to 6 carbon atoms, a linear or branched dihydroxyalkyl group having 2 to 6 carbon atoms, $-(CO-O-R^{12}-)_o R^{13}$ or $-(CO-NR^{11}-R^{12}-)_p R^{13}$,
m, n, o and p are each independently an integer from 0 to 300,
$Y^2$ is a chemical bond, O, CH2, C(O)O, OC(O), C(O)NR$^{10}$ or NR$^{10}$C(O),
$R^{10}$, $R^{11}$, $R^{12}$ are each independently hydrogen or a linear or branched alkyl radical having 1 to 50 carbon atoms,
$R^{13}$ is a linear or branched alkylene radical having 1 to 50 carbon atoms.

In the compounds of the formula (4), $R^8$ is preferably hydrogen or methyl.

In the compounds of the formula (4), $R^9$ is preferably H, a linear or branched alkyl group having 1 to 50 carbon atoms, a linear or branched monohydroxyalkyl group having 2 to 6 carbon atoms or a linear or branched dihydroxyalkyl group having 2 to 6 carbon atoms.

In the compounds of the formula (4), $Y^2$ is preferably a chemical bond, OC(O), C(O)NR$^{10}$ or NR$^{10}$C(O).

Particularly preferred structural units of the formula (4) are derived from monomers from the group consisting of vinyl acetate, methyl vinyl ether, ethyl vinyl ether, methyl allyl ether, ethyl methallyl ether, methyl methallyl ether, ethyl allyl ether, tert-butylacrylamide, N,N-diethylacrylamide, N,N-dimethylacrylamide, N,N-dimethylmethacrylamide, N,N-dipropylacrylamide, N-isopropylacrylamide, N-propylacrylamide, acrylamide, methacrylamide, methyl acrylate, methymethyl acrylate, tert-butyl acrylate, tert-butyl methacrylate, n-butyl acrylate, n-butyl methacrylate, lauryl acrylate, lauryl methacrylate, behenyl acrylate, behenyl methacrylate, cetyl acrylate, cetyl methacrylate, stearyl acrylate, stearyl methacrylate, tridecyl acrylate, tridecyl methacrylate, polyethoxy-(5) methacrylate, polyethoxy-(5) acrylate, polyethoxy-(10) methacrylate, polyethoxy-(10) acrylate, behenyl polyethoxy-(7) methacrylate, behenyl polyethoxy-(7) acrylate, behenyl polyethoxy-(8) methacrylate, behenyl polyethoxy-(8) acrylate, behenyl polyethoxy-(12) methacrylate, behenyl polyethoxy-(12) acrylate, behenyl polyethoxy-(16) methacrylate, behenyl polyethoxy-(16) acrylate, behenyl polyethoxy-(25) methacrylate, behenyl polyethoxy-(25) acrylate, lauryl polyethoxy-(7) methacrylate, lauryl polyethoxy-(7) acrylate, lauryl polyethoxy-(8) methacrylate, lauryl polyethoxy-(8) acrylate, lauryl polyethoxy-(12) methacrylate, lauryl polyethoxy-(12) acrylate, lauryl polyethoxy-(16) methacrylate, lauryl polyethoxy-(16) acrylate, lauryl polyethoxy-(22) methacrylate, lauryl polyethoxy-(22) acrylate, lauryl polyethoxy-(23) methacrylate, lauryl polyethoxy-(23) acrylate, cetyl polyethoxy-(2) methacrylate, cetyl polyethoxy-(2) acrylate, cetyl polyethoxy-(7) methacrylate, cetyl polyethoxy-(7) acrylate, cetyl polyethoxy-(10) methacrylate, cetyl polyethoxy-(10) acrylate, cetyl polyethoxy-(12) methacrylate, cetyl polyethoxy-(12) acrylat, cetyl polyethoxy-(16) methacrylate, cetyl polyethoxy-(16) acrylate, cetyl polyethoxy-(20) methacrylate, cetyl polyethoxy-(20) acrylate, cetyl polyethoxy-(25) methacrylate, cetyl polyethoxy-(25) acrylate, cetyl polyethoxy-(25) methacrylate, cetyl polyethoxy-(25) acrylate, stearyl polyethoxy-(7) methacrylate, stearyl polyethoxy-(7) acrylate, stearyl polyethoxy-(8) methacrylate, stearyl polyethoxy-(8) acrylate, stearyl polyethoxy-(12) methacrylate, stearyl polyethoxy-(12) acrylate, stearyl polyethoxy-(16) methacrylate, stearyl polyethoxy-(16) acrylate, stearyl polyethoxy-(22) methacrylate, stearyl polyethoxy-(22) acrylate, stearyl polyethoxy-(23) methacrylate, stearyl polyethoxy-(23) acrylate, stearyl polyethoxy-(25) methacrylate, stearyl polyethoxy-(25) acrylate, tridecyl polyethoxy-(7) methacrylate, tridecyl polyethoxy-(7) acrylate, tridecyl polyethoxy-(10) methacrylate, tridecyl polyethoxy-(10) acrylate, tridecyl polyethoxy-(12) methacrylate, tridecyl polyethoxy-(12) acrylate, tridecyl polyethoxy-(16) methacrylate, tridecyl polyethoxy-(16) acrylate, tridecyl polyethoxy-(22) methacrylate, tridecyl polyethoxy-(22) acrylate, tridecyl polyethoxy-(23) methacrylate, tridecyl polyethoxy-(23) acrylate, tridecyl polyethoxy-(25) methacrylate, tridecyl polyethoxy-(25) acrylate, methoxy polyethoxy-(7) methacrylate, methoxy polyethoxy-(7) acrylate, methoxy polyethoxy-(12) methacrylate, methoxy polyethoxy-(12) acrylate, methoxy polyethoxy-(16) methacrylate, methoxy polyethoxy-(16) acrylate, methoxy polyethoxy-(25) methacrylate, methoxy polyethoxy-(25) acrylate.

Each of the polymers C may include various structural units of component b) that derive from one or more of the structural units of the formulae (2) to (4). A polymer C may contain, for example, two or more structural units of the formula (2) which differ from one another by different $R^5$ and $R^6$ radicals. For example, it is possible for both N-vinylformamide and N-methyl-N-vinylacetamide to occur in a polymer C. A further polymer C may also contain, for example, two or more structural units of the formula (2) and formula (4) which differ in their chemical construction. For example, both N-vinylformamide and acrylamide may occur in a polymer C. A further polymer C may, for example, also contain two or more uncharged structural units of the formulae (2) to (4). For example, N-methyl-N-vinylacetamide, acrylamide and also N-vinyl-2-pyrrolidone may occur in a polymer C.

The anionic structural units c) of the polymers C preferably derive from monomers of the formula (5)

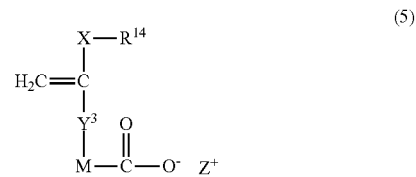

(5)

where
$R^{14}$, $R^{15}$ is hydrogen, methyl or ethyl, C(O)O—$Z^+$,
X, $Y^3$ is a chemical bond, O, $CH_2$, C(O)O, OC(O), C(O)NR$^{15}$ or NR$^{15}$C(O),
M is a chemical bond, —[C(O)O—CH$_2$—CH$_2$]$_q$—, a linear or branched alkylene group having 1 to 6 carbon atoms, a linear or branched, mono- or polyunsaturated alkenylene group having 2 to 6 carbon atoms, a linear monohydroxyalkylene group having 2 to 6 carbon atoms or a linear or branched dihydroxyalkylene group having 3 to 6 carbon atoms,
q is an integer of 1-5 and
$Z+$ is H+, Li+, Na+, K+, Zr+, ½ Ca++, ½ Mg++, ½ Zn++, ⅓ Al+++, ¼ Zr++++ or is mixtures of these ions.

In the formula (5), X is preferably a chemical bond or $CH_2$.

In the formula (5), $Y^3$ is preferably a chemical bond, $CH_2$, C(O)O, or C(O)NR$^{15}$ In the formula (5), M is preferably a chemical bond, —[C(O)O—CH$_2$—CH$_2$]$_q$— or a linear or branched alkylene group having 1 to 6 carbon atoms.

Particularly preferred structural units of the formula (5) are derived from monomers from the group consisting of acrylic acid, ammonium acrylate, sodium acrylate, potassium acrylate, lithium acrylate, zinc acrylate, calcium acrylate, magnesium acrylate, zirconium acrylate, methacrylic acid, ammonium methacrylate, sodium methacrylate, potassium methacrylate, lithium methacrylate, calcium methacrylate, magnesium methacrylate, zirconium methacrylate, zinc methacrylate, 2-carboxyethylacrylate, ammonium 2-carboxyethylacrylate, sodium 2-carboxyethylacrylate, potassium 2-carboxyethylacrylate, lithium 2-carboxyethylacrylate, zinc 2-carboxyethylacrylate, calcium 2-carboxyethylacrylate, magnesium 2-carboxyethylacrylate, zirconium 2-carboxyethylacrylate, 2-carboxyethylacrylate oligomers, ammonium 2-carboxyethylacrylate oligomers, sodium 2-carboxyethylacrylate oligomers, potassium 2-carboxyethylacrylate oligomers, lithium 2-carboxyethylacrylate oligomers, zinc 2-carboxyethylacrylate oligomers, calcium 2-carboxyethylacrylate oligomers, magnesium 2-carboxyethylacrylate oligomers, zirconium 2-carboxyethylacrylate oligomers, itaconic acid, sodium itaconate, potassium itaconate, lithium itaconate, calcium itaconate, magnesium itaconate, zirconium itaconate, zinc itaconate, 2-ethylacrylic acid, ammonium 2-ethylacrylate, sodium 2-ethylacrylate, potassium 2-ethylacrylate, lithium 2-ethylacrylate, calcium 2-ethylacrylate, magnesium 2-ethylacrylate, zirconium 2-ethylacrylate, zinc 2-ethylacrylate, 2-propylacrylic acid, ammonium 2-propylacrylate, sodium 2-propylacrylate, potassium 2-propylacrylate, lithium 2-propylacrylate, calcium 2-propylacrylate, magnesium 2-propylacrylate, magnesium 2-propylacrylate, zirconium 2-propylacrylate, zinc 2-propylacrylate.

Preferred polymers C contain 18 to 59.5 mol %, especially 22.5 to 54.25 mol %, of structural units of the formula (1), preferably derived from the sodium salt of acryloyldimethyltaurate, vinylsulfonic acid or vinylphosphonic acid, 40 to 70 mol %, especially 45 to 67.5 mol %, of structural units b), preferably acrylamide, N-methyl-N-vinylacetamide, N-vinylformamide, or N-vinyl-2-pyrrolidone and 0.5 to 12 mol %, especially 0.75 to 10 mol %, of structural units c) which preferably derive from acrylic acid, carboxyethyl acrylate, methacrylic acid or the alkali metal or alkaline earth metal salts of the compounds mentioned.

Particularly preferred polymers C contain 27 to 49 mol % of structural units of the formula (1), preferably derived from the sodium salt of acryloyldimethyltaurate, vinylsulfonic acid or vinylphosphonic acid, 50 to 65 mol % of structural units b), preferably acrylamide, N-methyl-N-vinylacetamide, N-vinylformamide or N-vinyl-2-pyrrolidone and 1 to 8 mol % of structural units c), preferably derived from the sodium salt of the carboxylate anion.

The distribution of the different structural units in the polymers C may be random, in blocks, alternating or in a gradient.

The polymers C are prepared by means of free-radical precipitation polymerization in a polar solvent or solvent mixture. In this case, the corresponding monomers from which the structural units of components a) to c) derive are dissolved or dispersed in a polar solvent or solvent mixture and the polymerization is initiated in a manner known per se, for example by addition of a free-radical-forming compound. It is possible here, for example, to "directly" polymerize the initially charged monomers. Alternatively, they can be neutralized prior to the polymerization, for example by reacting acid groups in monomers used with bases prior to the polymerization, forming the counterions $Q^+$ and $Z^+$ of the structural units of formula (1) and formula (5). Rather than the neutralization of the monomers prior to the polymerization, however, it is also possible to neutralize the polymers with the bases on completion of polymerization.

In a further preferred embodiment of the process of the invention for preparation of the polymers C, the monomers from which the structural units of components a) to c) derive are free-radically polymerized in a polar solvent or solvent mixture, and, optionally, the monomers prior to the polymerization or the polymer C after the polymerization are neutralized with an $Li^+$—, $Na^+$—, $K^+$—, $Zr^+$—, $Ca^{++}$—, $Mg^{++}$— or $Zn^{++}$-containing base, preferably with the appropriate hydroxides, hydrogencarbonates and carbonates and more preferably with hydrogencarbonates and carbonates.

Preferred bases for neutralization of the structural units of components a) and c) are sodium hydrogencarbonate, sodium carbonate, sodium hydroxide, potassium hydrogencarbonate, potassium carbonate, potassium hydroxide, lithium hydrogencarbonate, lithium carbonate, lithium hydroxide, calcium hydrogencarbonate, calcium carbonate, calcium hydroxide, preferably sodium hydrogencarbonate, sodium carbonate, sodium hydroxide, potassium hydrogencarbonate, potassium carbonate, potassium hydroxide, particular preference being given to sodium hydrogencarbonate, sodium carbonate, sodium hydroxide, and especial preference being given to sodium hydrogencarbonate and sodium carbonate.

In a further preferred embodiment of the process of the invention for preparation of the polymers C, the free-radical precipitation polymerization is effected in a polar solvent or solvent mixture which has the characteristic feature of having a boiling point of 60 to 110° C., preferably of 60 to 95° C., more preferably of 65 to 90° C.

In a further preferred embodiment of the process of the invention for preparation of the polymers C, the polar solvent comprises a mixture of:
d) water
and
e) one or more further polar solvents.

In a further preferred embodiment of the process of the invention, component e) consists of a solvent mixture comprising one or more polar organic solvents.

In a particularly preferred embodiment of the process of the invention, component e) consists of a solvent mixture comprising one or more alcohols and one or more ketones.

In a further preferred embodiment of the process of the invention, component e) comprises one or more polar solvents selected from the group of methanol, ethanol, 1-propanol, 2-propanol, 2-methyl-2-propanol, 1-butanol, 2-butanol, dimethyl ketone, diethyl ketone, tetrahydropyran, tetrahydrofuran, 2-methyltetrahydrofuran, 1,3-dioxane, 1,4-dioxane, preferably ethanol, 1-propanol, 2-propanol, 2-methylpropan-2-ol, 1-butanol, 2-butanol, dimethyl ketone, tetrahydrofuran, 2-methyltetrahydrofuran, 1,3-dioxane, more preferably 2-propanol, 2-methylpropan-2-ol, dimethyl ketone, tetrahydrofuran, 2-methyltetrahydrofuran, 1,3-dioxane, especially preferably 2-methylpropan-2-ol and dimethyl ketone.

In the process of the invention, various polar solvents may be present within component e). An inventive polar solvent in component e) may comprise dimethyl ketone, for example. A further inventive polar solvent of component e) may comprise, for example, a mixture of 2-methylpropan-2-ol and dimethyl ketone. A further inventive solvent of component e) may comprise, for example, a mixture of dimethyl ketone, 2-methylpropan-2-ol and tetrahydrofuran.

In a particular embodiment of the process of the invention, the polar solvent mixture comprises 0.5% to 10% by weight, preferably 1% to 8% by weight of water and more preferably 2% to 5% by weight of water.

In a further particular embodiment of the process of the invention, the polar solvent mixture comprises 1% to 99.5% by weight, preferably 5% to 95% by weight and more preferably 10% to 90% by weight of 2-methylpropan-2-ol.

In a further particular embodiment of the process of the invention, the polar solvent mixture comprises 0.5% to 10% by weight of water, 1% to 98.5% by weight of 2-methylpropan-2-ol and 1% to 98.5% by weight of dimethyl ketone, preferably 0.5% to 7.5% by weight of water, 5% to 94.5% by weight of 2-methylpropan-2-ol and 5% to 94.5% by weight of dimethyl ketone, more preferably 1% to 5% by weight of water, 7.5% to 91.5% by weight of 2-methylpropan-2-ol and 7.5% to 91.5% by weight of dimethyl ketone.

A particularly preferred embodiment of the process of the invention is preferably effected in a mixture of 2-methylpropan-2-ol, dimethyl ketone and water. The water content of this mixture must not exceed 10% by weight, since formation of lumps can otherwise occur over the course of the polymerization. Specifically, the choice of the amount and type of solvent mixture has to be made such that the salt of the repeat structural unit of the formula (1), especially of the acryloyldimethyltaurate, is substantially soluble or dispersible therein. "Substantially soluble or dispersible" is understood to mean that no solid material settles out of the solution or dispersion even after the stirrer has been switched off. The polymer C that forms in the course of the reaction, by contrast, is to be substantially insoluble in the solvent mixture chosen. "Substantially insoluble" is understood to mean here that a well-stirrable, slurry-like polymer paste forms in the course of the polymerization, in which there must be no formation of lumps or conglutinations. The filtrate obtainable by filtering the paste with suction must not have a solids content of more than 5% by weight. If the polymers C are soluble in the solvent or solvent mixture chosen to any greater degree, lumps may be formed in the course of drying of the polymer paste.

The polymerization reaction itself is triggered in a manner known per se by free-radical-forming compounds such as azo initiators (e.g. azobisisobutyronitrile, 2,2'-azobis(4-methoxy-2,4-dimethylvaleronitrile), 2,2'-azobis(2,4-dimethylvaleronitrile), dimethyl 2,2'-azobis(2-methylpropionate), 2,2'-azobis(2-methyl-butyronitrile), 1,1'-azobis(cyclohexane-1-carbonitrile) or 2,2'-azobis[N-(2-propenyl)-2-methylpropionamide]), peroxides (e.g. dilauryl peroxide, tert-butyl hydroperoxide, di-tert-butyl peroxide, triphenylmethyl hydroperoxide, benzoyl peroxide), or persulfates within a suitable temperature range from 20 to 120° C., preferably between 30 and 80° C. and especially preferably between 40 and 70° C., and continued over a period of 30 min to several hours.

The polymers C are obtained as a white voluminous precipitate in the polar solvent mixture. Isolation can be accomplished by using all standard evaporation and drying isolation processes. More particularly, the polar solvent mixture can be separated from the product by a pressure filtration or distillation. A minor residue of the polar solvent mixture is not an issue either from a safety point of view or for application-related reasons.

The polymers C prepared by the process of the invention are advantageously suitable for use as water loss reducers in drilling muds and cement slurries. These are used in deep wells for reduction of water loss at the well wall and as a means of reducing the water loss in cement slurries. Such additives are also called fluid loss additives or fluid loss control additives.

The present invention further provides for the use of the polymers C in water-based drilling fluids. These drilling fluids may comprise further additives as well as the polymers C. Additives of this kind are, for example, bentonites, clay stabilizers, lignin/lignosulfonates, pH stabilizers (e.g. hydroxides), thermal stabilizers (e.g. monoethanolamine or sulfonated synthetic polymers) and weighting agents (e.g. barite, magnetite, calcium carbonate, ilmenite) for establishment of the desired density.

The present invention further provides a method of cementing deep wells, in which a cement slurry is introduced into the well and contains the polymers C in a concentration of 0.01%-5% bwoc (by weight of cement), preferably 0.05% to 2.5% bwoc. Further components of the cement slurries are water in different salinity and cement. It is also possible to use dispersants, retardants, accelerators, extenders, defoamers or silicate derivatives as auxiliaries.

EXAMPLES

A) Process

In process examples 1 to 20 cited, the polar solvent used which was used to prepare the polymers C was varied. As well as the polar solvent used, further polymers C of the invention were prepared in process examples 1 to 20 by the variation of the monomers. These polymers C and the process example used for the synthesis are compiled in table 1a) to 1c).

Process Example 1

In a 2 liter Quickfit flask with anchor stirrer, reflux condenser with off gas scrubber, combined thermometer/pH meter and a gas inlet tube, 234 g of anhydrous 2-methyl-propan-2-ol and 158 g of dimethyl ketone are admixed with 8 g of distilled water.

The reaction vessel is in a heating bath thermostat. This reaction vessel is blanketed with nitrogen gas and, in a gentle opposing nitrogen stream, 65 g of acryloyldimethyltaurate, 3 g of acrylic acid and 30 g of sodium hydrogencarbonate are introduced. The acryloyldimethyltaurate sodium salt does not dissolve completely in the 2-methylpropan-2-ol/dimethyl ketone/water mixture and is partly in the form of a dispersion of solids. The reaction vessel is blanketed with nitrogen, and 17 g of acrylamide and 15 g of N-vinyl-2-pyrrolidone are introduced. After introduction of the acrylamide and N-vinyl-2-pyrrolidone, the pH is checked once again and corrected if necessary by addition of sodium hydrogencarbonate to pH 7 to 8. A constant nitrogen stream is passed through the solution for at least 1 hour. After this inertization period, the residual oxygen can be monitored by means of an oxygen electrode. Should the measured residual oxygen value in the liquid phase exceed the value of 5 ppm, further inertization may be necessary until this value is attained. Thereafter, the reaction vessel is heated to 40 to 60° C., and 1.0 g of azobis(isobutyronitrile) is added in a gentle nitrogen stream. The initiation of the polymerization becomes apparent from a rise in the internal temperature. After the initiation, the introduction of nitrogen gas is ended. About 5-10 minutes after onset of the polymerization reaction, the temperature maximum has been exceeded and the temperature in the reaction vessel is increased by the heating bath up to the boiling point of the 2-methylpropan-2-ol:dimethyl ketone:water mixture. Under gentle reflux, the now viscous mass is stirred for a further two hours. The reaction product, in the form of a viscous suspension of polymer in the 2-methylpropan-2-ol:dimethyl ketone:water mixture, is isolated by filtration and subsequent drying in a vacuum drying cabinet.

Process Example 2

In a 2 liter Quickfit flask with anchor stirrer, reflux condenser with offgas scrubber, combined thermometer/pH meter and a gas inlet tube, 234 g of anhydrous 2-methyl-propan-2-ol and 154 g of dimethyl ketone are admixed with 12 g of distilled water. The reaction vessel is in a heating bath thermostat. The further steps of polymerization process 2 are conducted analogously to polymerization process 1. The changes in the monomer compositions are listed accurately in table 1.

Process Example 3

In a 2 liter Quickfit flask with anchor stirrer, reflux condenser with offgas scrubber, combined thermometer/pH meter and a gas inlet tube, 234 g of anhydrous 2-methyl-propan-2-ol and 154 g of dimethyl ketone are admixed with 16 g of distilled water. The reaction vessel is in a heating bath thermostat. The further steps of polymerization process 3 are conducted analogously to polymerization process 1. The changes in the monomer compositions are listed accurately in table 1.

Process Example 4

In a 2 liter Quickfit flask with anchor stirrer, reflux condenser with offgas scrubber, combined thermometer/pH meter and a gas inlet tube, 296 g of anhydrous 2-methyl-propan-2-ol and 94 g of dimethyl ketone are admixed with 10 g of distilled water. The reaction vessel is in a heating bath thermostat. The further steps of polymerization process 4 are conducted analogously to polymerization process 1. The changes in the monomer compositions are listed accurately in table 1.

Process Example 5

In a 2 liter Quickfit flask with anchor stirrer, reflux condenser with offgas scrubber, combined thermometer/pH meter and a gas inlet tube, 296 g of anhydrous 2-methylpropan-2-ol and 86 g of dimethyl ketone are admixed with 14 g of distilled water. The reaction vessel is in a heating bath thermostat. The further steps of polymerization process 5 are conducted analogously to polymerization process 1. The changes in the monomer compositions are listed accurately in table 1.

Process Example 6

In a 2 liter Quickfit flask with anchor stirrer, reflux condenser with offgas scrubber, combined thermometer/pH meter and a gas inlet tube, 296 g of anhydrous 2-methylpropan-2-ol and 90 g of dimethyl ketone are admixed with 18 g of distilled water. The reaction vessel is in a heating bath thermostat. The further steps of polymerization process 6 are conducted analogously to polymerization process 1. The changes in the monomer compositions are listed accurately in table 1.

Process Example 7

In a 2 liter Quickfit flask with anchor stirrer, reflux condenser with offgas scrubber, combined thermometer/pH meter and a gas inlet tube, 197 g of anhydrous 2-methylpropan-2-ol and 197 g of dimethyl ketone are admixed with 6 g of distilled water. The reaction vessel is in a heating bath thermostat. The further steps of polymerization process 7 are conducted analogously to polymerization process 1. The changes in the monomer compositions are listed accurately in table 1.

Process Example 8

In a 2 liter Quickfit flask with anchor stirrer, reflux condenser with offgas scrubber, combined thermometer/pH meter and a gas inlet tube, 195 g of anhydrous 2-methylpropan-2-ol and 197 g of dimethyl ketone are admixed with 10 g of distilled water. The reaction vessel is in a heating bath thermostat. The further steps of polymerization process 8 are conducted analogously to polymerization process 1. The changes in the monomer compositions are listed accurately in table 1.

Process Example 9

In a 2 liter Quickfit flask with anchor stirrer, reflux condenser with offgas scrubber, combined thermometer/pH meter and a gas inlet tube, 193 g of anhydrous 2-methylpropan-2-ol and 193 g of dimethyl ketone are admixed with 14 g of distilled water. The reaction vessel is in a heating bath thermostat. The further steps of polymerization process 9 are conducted analogously to polymerization process 1. The changes in the monomer compositions are listed accurately in table 1.

Process Example 10

In a 2 liter Quickfit flask with anchor stirrer, reflux condenser with offgas scrubber, combined thermometer/pH meter and a gas inlet tube, 191 g of anhydrous 2-methylpropan-2-ol and 191 g of dimethyl ketone are admixed with 18 g of distilled water. The reaction vessel is in a heating bath thermostat. The further steps of polymerization process 10 are conducted analogously to polymerization process 1. The changes in the monomer compositions are listed accurately in table 1.

Process Example 11

In a 2 liter Quickfit flask with anchor stirrer, reflux condenser with offgas scrubber, combined thermometer/pH meter and a gas inlet tube, 90 g of anhydrous 2-methylpropan-2-ol and 298 g of dimethyl ketone are admixed with 12 g of distilled water. The reaction vessel is in a heating bath thermostat. The further steps of polymerization process 11 are conducted analogously to polymerization process 1. The changes in the monomer compositions are listed accurately in table 1.

Process Example 12

In a 2 liter Quickfit flask with anchor stirrer, reflux condenser with offgas scrubber, combined thermometer/pH meter and a gas inlet tube, 90 g of anhydrous 2-methylpropan-2-ol and 294 g of dimethyl ketone are admixed with 16 g of distilled water. The reaction vessel is in a heating bath thermostat. The further steps of polymerization process 12 are conducted analogously to polymerization process 1. The changes in the monomer compositions are listed accurately in table 1.

Process Example 13

In a 2 liter Quickfit flask with anchor stirrer, reflux condenser with offgas scrubber, combined thermometer/pH meter and a gas inlet tube, 90 g of anhydrous 2-methylpropan-2-ol and 290 g of dimethyl ketone are admixed with 20 g of distilled water. The reaction vessel is in a heating bath thermostat. The further steps of polymerization process 13 are conducted analogously to polymerization process 1. The changes in the monomer compositions are listed accurately in table 1.

Process Example 14

In a 2 liter Quickfit flask with anchor stirrer, reflux condenser with offgas scrubber, combined thermometer/pH meter and a gas inlet tube, 60 g of anhydrous 2-methylpropan-2-ol and 320 g of dimethyl ketone are admixed with 20 g of distilled water. The reaction vessel is in a heating bath thermostat. The further steps of polymerization process 14 are conducted analogously to polymerization process 1. The changes in the monomer compositions are listed accurately in table 1.

Process Example 15

In a 2 liter Quickfit flask with anchor stirrer, reflux condenser with offgas scrubber, combined thermometer/pH meter and a gas inlet tube, 60 g of anhydrous 2-methylpropan-2-ol and 316 g of dimethyl ketone are admixed with 24 g of distilled water. The reaction vessel is in a heating bath thermostat. The further steps of polymerization process 15 are conducted analogously to polymerization process 1. The changes in the monomer compositions are listed accurately in table 1.

Process Example 16

In a 2 liter Quickfit flask with anchor stirrer, reflux condenser with offgas scrubber, combined thermometer/pH meter and a gas inlet tube, 384 g of tetrahydrofuran are admixed with 16 g of distilled water. The reaction vessel is in a heating bath thermostat. The further steps of polymerization process 16 are conducted analogously to polymerization process 1. The changes in the monomer compositions are listed accurately in table 1.

Process Example 17

In a 2 liter Quickfit flask with anchor stirrer, reflux condenser with offgas scrubber, combined thermometer/pH meter and a gas inlet tube, 394 g of tetrahydrofuran are admixed with 6 g of distilled water. The reaction vessel is in a heating bath thermostat. The further steps of polymerization process 17 are conducted analogously to polymerization process 1. The changes in the monomer compositions are listed accurately in table 1.

Process Example 18

In a 2 liter Quickfit flask with anchor stirrer, reflux condenser with offgas scrubber, combined thermometer/pH meter and a gas inlet tube, 390 g of anhydrous 2-methyltetrahydrofuran are admixed with 10 g of distilled water. The reaction vessel is in a heating bath thermostat. The further steps of polymerization process 18 are conducted analogously to polymerization process 1. The changes in the monomer compositions are listed accurately in table 1.

Process Example 19

In a 2 liter Quickfit flask with anchor stirrer, reflux condenser with offgas scrubber, combined thermometer/pH meter and a gas inlet tube, 300 g of anhydrous 2-methylpropan-2-ol and 86 g of 2-methyltetrahydrofuran are admixed with 14 g of distilled water. The reaction vessel is in a heating bath thermostat. The further steps of polymerization process 19 are conducted analogously to polymerization process 1. The changes in the monomer compositions are listed accurately in table 1.

Process Example 20

In a 2 liter Quickfit flask with anchor stirrer, reflux condenser with offgas scrubber, combined thermometer/pH meter and a gas inlet tube, 90 g of anhydrous 2-methylpropan-2-ol and 300 g of 2-methyltetrahydrofuran are admixed with 5 g of distilled water. The reaction vessel is in a heating bath thermostat. The further steps of polymerization process 20 are conducted analogously to polymerization process 1. The changes in the monomer compositions are listed accurately in table 1.

The polymers C which have been prepared according to inventive process examples 1 to 20 are listed in table 1 below. Changes made, for example the use of another base and the amount used for neutralization of the acryloyldimethyltaurate or the use of another initiator and the amount used, are set out in table 1.

TABLE 1

Examples of polymers C prepared by the inventive polymerization processes 1 to 20

| Ref. Polymer | Proc. ex. | ACDMT/ mol % | Comonomer 1 Name | /mol % | Comonomer 2 Name | /mol % | Comonomer 3 Name | /mol % | Comonomer 4 Name | /mol % | Neutralizing agent Name | /g | Initiator Name | /g | k value |
|---|---|---|---|---|---|---|---|---|---|---|---|---|---|---|---|
| C - 1 | 1 | 43.7 | AA | 4.21 | AM | 33.3 | NVP | 18.80 | — | — | NaHCO$_3$ | 30 | AIBN | 1.0 | 210 |
| C - 2 | 2 | 45.0 | AA | 4.03 | AM | 32.5 | NVP | 18.48 | — | — | NaHCO$_3$ | 30 | AIBN | 1.0 | 215 |
| C - 3 | 3 | 45.0 | AA | 4.03 | AM | 32.5 | NVP | 18.48 | — | — | NaHCO$_3$ | 30 | AIBN | 1.0 | 223 |
| C - 4 | 5 | 45.0 | AA | 4.03 | AM | 32.5 | NVP | 18.48 | — | — | NaHCO$_3$ | 30 | AIBN | 1.0 | 204 |
| C - 5 | 8 | 45.0 | AA | 4.03 | AM | 32.5 | NVP | 18.48 | — | — | NaHCO$_3$ | 30 | AIBN | 1.0 | 188 |
| C - 6 | 9 | 45.0 | AA | 4.03 | AM | 32.5 | NVP | 18.48 | — | — | NaHCO$_3$ | 30 | AIBN | 1.0 | 199 |
| C - 7 | 11 | 45.0 | AA | 4.03 | AM | 32.5 | NVP | 18.48 | — | — | NaHCO$_3$ | 30 | AIBN | 1.0 | 190 |
| C - 8 | 12 | 45.0 | AA | 4.03 | AM | 32.5 | NVP | 18.48 | — | — | NaHCO$_3$ | 30 | AIBN | 1.0 | 251 |
| C - 9 | 14 | 45.0 | AA | 4.03 | AM | 32.5 | NVP | 18.48 | — | — | NaHCO$_3$ | 30 | AIBN | 1.0 | 249 |
| C - 10 | 19 | 45.0 | AA | 4.03 | AM | 32.5 | NVP | 18.48 | — | — | NaHCO$_3$ | 30 | AIBN | 1.0 | 208 |
| C - 21 | 1 | 30.9 | AA | 6.0 | AM | 63.1 | — | — | — | — | NaHCO$_3$ | 54.7 | AIBN | 2.5 | 183 |
| C - 22 | 3 | 30.9 | AA | 6.0 | AM | 63.1 | — | — | — | — | NaHCO$_3$ | 54.7 | AIBN | 2.5 | 227 |
| C - 23 | 4 | 30.9 | AA | 6.0 | AM | 63.1 | — | — | — | — | NaHCO$_3$ | 54.7 | AIBN | 2.5 | 197 |
| C - 24 | 5 | 30.9 | AA | 6.0 | AM | 63.1 | — | — | — | — | NaHCO$_3$ | 54.7 | AIBN | 2.5 | 217 |
| C - 25 | 9 | 30.9 | AA | 6.0 | AM | 63.1 | — | — | — | — | NaHCO$_3$ | 54.7 | AIBN | 2.5 | 219 |
| C - 26 | 11 | 30.9 | AA | 6.0 | AM | 63.1 | — | — | — | — | NaHCO$_3$ | 54.7 | AIBN | 2.5 | 222 |
| C - 27 | 12 | 30.9 | AA | 6.0 | AM | 63.1 | — | — | — | — | NaHCO$_3$ | 54.7 | AIBN | 2.5 | 228 |
| C - 28 | 16 | 30.9 | AA | 6.0 | AM | 63.1 | — | — | — | — | NaHCO$_3$ | 54.7 | AIBN | 2.5 | 140 |
| C - 29 | 17 | 30.9 | AA | 6.0 | AM | 63.1 | — | — | — | — | NaHCO$_3$ | 54.7 | AIBN | 2.5 | 134 |
| C - 30 | 19 | 30.9 | AA | 6.0 | AM | 63.1 | — | — | — | — | NaHCO$_3$ | 54.7 | AIBN | 2.5 | 173 |
| C - 31 | 2 | 40.1 | AA | 1.00 | VIMA | 29.0 | AM | 29.9 | — | — | NaHCO$_3$ | 40.2 | AIBN | 1.40 | 196 |
| C - 32 | 5 | 40.1 | AA | 1.00 | VIMA | 29.0 | AM | 29.9 | — | — | NaHCO$_3$ | 40.2 | AIBN | 1.10 | 237 |
| C - 33 | 8 | 40.1 | AA | 1.00 | VIMA | 29.0 | AM | 29.9 | — | — | NaHCO$_3$ | 40.2 | AIBN | 1.10 | 206 |
| C - 34 | 8 | 40.1 | AA | 1.00 | VIMA | 29.0 | AM | 29.9 | — | — | NaHCO$_3$ | 40.2 | AIBN | 1.10 | 211 |
| C - 35 | 18 | 40.1 | AA | 1.00 | VIMA | 29.0 | AM | 29.9 | — | — | NaHCO$_3$ | 40.2 | AIBN | 1.10 | 138 |
| C - 36 | 3 | 41.1 | AA | 2.5 | AM | 56.4 | — | — | — | — | NaHCO$_3$ | 27.4 | AIBN | 1.30 | 221 |
| C - 37 | 3 | 40.1 | AA | 5.0 | AM | 54.9 | — | — | — | — | NaHCO$_3$ | 29.1 | AIBN | 1.30 | 229 |
| C - 38 | 3 | 39.0 | AA | 7.5 | AM | 53.5 | — | — | — | — | NaHCO$_3$ | 30.8 | AIBN | 1.30 | 217 |
| C - 39 | 3 | 38.0 | AA | 9.9 | AM | 52.1 | — | — | — | — | NaHCO$_3$ | 32.6 | AIBN | 1.30 | 226 |
| C - 40 | 3 | 35.8 | AA | 15.0 | AM | 49.1 | — | — | — | — | NaHCO$_3$ | 36.7 | AIBN | 1.40 | 227 |
| C - 46 | 9 | — | AA | 3.99 | AM | 32.2 | NVP | 18.30 | ACNMT | 45.5 | NaHCO$_3$ | 30.2 | AIBN | 1.20 | 225 |
| C - 47 | 9 | — | AA | 4.3 | AM | 39.1 | VIMA | 20.72 | ACNMT | 34.2 | NaHCO$_3$ | 29.1 | AIBN | 1.50 | 228 |
| C - 49 | 9 | — | VPS | 8.5 | AM | 33.7 | MAA | 8.13 | ACNMT | 49.1 | NaHCO$_3$ | 34.9 | AIBN | 1.00 | 217 |

TABLE 1-continued

Examples of polymers C prepared by the inventive polymerization processes 1 to 20

| Ref. Polymer | Proc. ex. | ACDMT/ mol % | Comonomer 1 Name | /mol % | Comonomer 2 Name | /mol % | Comonomer 3 Name | /mol % | Comonomer 4 Name | /mol % | Neutralizing agent Name | /g | Initiator Name | /g | k value |
|---|---|---|---|---|---|---|---|---|---|---|---|---|---|---|---|
| C - 50 | 9 | — | VPS | 10.1 | AM | 49.6 | MAA | 3.78 | ACNMT | 36.2 | NaHCO$_3$ | 36.0 | AIBN | 1.40 | 223 |
| C - 61 | 2 | 29.9 | AA | 35.01 | AM | 35.1 | — | | — | | NaHCO$_3$ | 26.4 | AIBN | 1.00 | 207 |
| C - 62 | 5 | 29.9 | AA | 35.01 | AM | 35.1 | — | | — | | NaHCO$_3$ | 26.4 | AIBN | 1.00 | 196 |
| C - 63 | 8 | 29.9 | AA | 35.01 | AM | 35.1 | — | | — | | NaHCO$_3$ | 26.4 | AIBN | 1.00 | 204 |
| C - 64 | 8 | 29.9 | AA | 35.01 | AM | 35.1 | — | | — | | NaHCO$_3$ | 26.4 | DLP | 1.00 | 205 |
| C - 65 | 18 | 29.9 | AA | 35.01 | AM | 35.1 | — | | — | | NaHCO$_3$ | 26.4 | AIBN | 1.00 | 189 |
| C - 66 | 2 | 45.0 | AA | 4.03 | AM | 32.5 | NVP | 18.48 | — | | KHCO$_3$ | 29.6 | AIBN | 1.00 | 207 |
| C - 67 | 8 | 45.0 | AA | 4.03 | AM | 32.5 | NVP | 18.48 | — | | LiHCO$_3$ | 23.9 | AIBN | 1.00 | 202 |
| C - 68 | 9 | 45.0 | AA | 4.03 | AM | 32.5 | NVP | 18.48 | — | | Na$_2$CO$_3$ | 37.3 | AIBN | 1.00 | 211 |
| C - 69 | 11 | 45.0 | AA | 4.03 | AM | 32.5 | NVP | 18.48 | — | | K$_2$CO$_3$ | 37.3 | AIBN | 1.00 | 233 |
| C - 70 | 12 | 45.0 | AA | 4.03 | AM | 32.5 | NVP | 18.48 | — | | Li$_2$CO$_3$ | 26.0 | AIBN | 1.00 | 227 |
| C - 74 | 3 | 30.9 | AA | 6.0 | AM | 63.1 | — | | — | | Li$_2$CO$_3$ | 48.1 | AIBN | 1.00 | 225 |
| C - 75 | 5 | 30.9 | AA | 6.0 | AM | 63.1 | — | | — | | KOH | 36.5 | AIBN | 1.00 | 217 |
| C - 76 | 11 | 30.9 | AA | 6.0 | AM | 63.1 | — | | — | | KHCO$_3$ | 54.7 | AIBN | 1.00 | 213 |
| C - 81 | 2 | 29.9 | AA | 35.01 | AM | 35.1 | — | | — | | KOH | 17.6 | AIBN | 1.00 | 209 |
| C - 82 | 5 | 29.9 | AA | 35.01 | AM | 35.1 | — | | — | | Na$_2$CO$_3$ | 33.3 | AIBN | 1.00 | 213 |
| C - 83 | 8 | 29.9 | AA | 35.01 | AM | 35.1 | — | | — | | NaOH | 12.6 | AIBN | 1.00 | 217 |
| C - 84 | 2 | 40.1 | VIMA | 29.0 | AM | 29.9 | AA | 1.00 | — | | K$_2$CO$_3$ | 50.7 | AIBN | 1.10 | 209 |
| C - 85 | 5 | 40.1 | VIMA | 29.0 | AM | 29.9 | AA | 1.00 | — | | KOH | 26.8 | AIBN | 1.10 | 211 |
| C - 86 | 8 | 40.1 | VIMA | 29.0 | AM | 29.9 | AA | 1.00 | — | | LiHCO$_3$ | 32.5 | AIBN | 1.10 | 214 |

ACDMT = acryloyldimethyltaurate,
VPS = vinylphosphonic acid,
VSS = vinylsulfonic acid,
AMPP = 2-acrylamido-2-methylpropanephosphonic acid,
SSS = styrenesulfonic acid,
NaSS = sodium styrenesulfonate,
ACT = acryloyltaurate,
ACNMT = acryloyl-N-methyltaurate,
NVP = N-vinyl-2-pyrrolidone,
Am = acrylamide,
DMAAm = dimethylacrylamide,
NVF = N-vinylformamide,
VIMA = N-vinyl-N-methylacetamide,
AA = acrylic acid,
MAA = methacrylic acid,
AIBN = azobis(isobutyronitrile)

Comparative Example 1

(noninventive, prepared according to EP 1045869 copolymer prepared in precipitation polymerization 44.5 mol % acryloyldimethyltaurate and 55.5 mol % acrylamide with ammonia gas as neutralizing reagent)

In a 3 liter Quickfit flask with anchor stirrer, reflux condenser with offgas scrubber, combined thermometer/pH meter and a gas inlet tube, 1700 g of anhydrous 2-methylpropan-2-ol are admixed with 50 mL of distilled water. The reaction vessel is in a heating bath thermostat.

This reaction vessel is blanketed with nitrogen gas, and 245 g of acryloyldimethyltaurate are introduced in a gentle opposing nitrogen stream. The acryloyldimethyltaurate does not dissolve completely in the 2-methylpropan-2-ol/water mixture and is partly in the form of a dispersion of solids. The pH of this mixture is below pH 1. Above the liquid phase, gaseous ammonia is introduced through the gas inlet tube until the pH of the dispersion is between 7 and 8. On attainment of the desired pH range, stirring is continued for another 1 hour and the pH is recorded continuously. The reaction vessel is blanketed with nitrogen, and 105 g of acrylamide are introduced. After the acrylamide has been introduced, the pH is checked again and if necessary corrected to the range of pH 7 to 8. A constant nitrogen stream is passed through the solution for at least 1 hour. After this inertization period, the residual oxygen is checked by means of an oxygen electrode. Should the measured residual oxygen value in the liquid phase exceed the value of 1 ppm, inertization has to be repeated until this value is attained. Thereafter, in a gentle nitrogen stream, 2 g of AIBN are added and the reaction vessel is heated to 60° C. Shortly after attainment of an internal temperature of 60° C., the introduction of nitrogen gas is ended and commencement of the polymerization reaction is observed, which can be determined by an increase in temperature of 10-15° C. About 5-15 minutes after onset of the polymerization reaction, the temperature has been exceeded and the temperature in the reaction vessel is increased by means of the heating bath up to the boiling point of the 2-methylpropan-2-ol/water mixture. Under gentle reflux, the now viscous mass is stirred for a further two hours. The reaction product, in the form of a viscous suspension of polymer in the 2-methylpropan-2-ol/water mixture, is separated off by filtration and subsequent drying in a vacuum drying cabinet.

Yield: 365 g
Dry content (IR dryer at 120° C. for 15 minutes): 96%
K value (0.5% solution in distilled water): 212

Comparative Example 2 According to EP 1033378
Noninventive

A polymerization flask of capacity 2 L, equipped with stirrer, reflux condenser, dropping funnel, gas inlet tube and electrically heated water bath, is initially charged with 600 mL of 2-methylpropan-2-ol, and 77.5 g of acryloyldimethyltaurate are suspended therein while stirring, then 8.5 L of NH$_3$ gas are introduced and then 7.5 g of acrylamide, 7.5 g of N-vinylformamide and 7.5 g of N-vinylpyrrolidone are added. With introduction of nitrogen, the electrical water bath is used to heat the reaction mixture to 50° C., and 1.0 g of azoisobutyronitrile is added. After an induction time of about 2 hours, polymerization sets in, the reaction temperature rises up to 70° C. and the polymer precipitates out. The mixture is heated at 80° C. for another 2 hours, forming a viscous suspension. The polymer can be isolated by filtration with suction and drying under reduced pressure at 50° C. However, it is also possible to distill the solvent out of the reaction mixture directly under reduced pressure. The polymer is obtained in the form of a white lightweight powder having good solubility in water. K value according to Fikentscher 170.

Comparative Example 3-1 to 3-5 According to US 2012/0095120 Noninventive

A 2 L glass reactor with an internal temperature of 20° C. is initially charged with 344 g of dimethyl ketone, 9.6 g of deionized water and the monomers specified in table 2 and the neutralizing reagent. The contents of the reactor are stirred and inertized with introduction of a strong nitrogen stream for 1 h. The reaction medium is heated to 55° C. and then 0.7 g of DLP (dilauryl peroxide) is added to initiate the polymerization. The reaction mixture is heated to reflux and kept there for 2 h. After cooling to room temperature, the reaction medium is filtered and the polymer residue is dried under reduced pressure.

conditioned at the study temperature and then at the same temperature the rheology with the FANN model 35SA viscometer (in the case of high temperature, conditioning is effected at 93° C. and the viscosity is measured). At temperatures >93° C., water loss is measured with a stirring fluid loss apparatus (SFLA).

Table 3 shows the water loss-reducing properties of selected abovementioned examples according to API spec. 10 at 121.1° C. (250° F.) in the stirred filtration test in the FANN HTHP filter press (stirring fluid loss apparatus, SFLA). The test was based on two assessment questions: was ammonia gas emitted during the making-up of the formulation and was it possible to improve the water loss reduction properties of the polymers C? It becomes clear here that no ammonia gas emission occurs any more with the polymers C. Direct comparison of the polymers C against the prior art likewise shows an improvement in the fluid loss properties. The polymer of EP 1045869 had an average fluid loss of 60 mL (mean value from three measurements) in the test conducted. Some of the polymers C were much lower in terms of their fluid loss values. Values of 40 to 45 mL were attained here.

Formulation of the cement slurries for an application at 250° F., about 121° C.:

600 g of Dyckerhoff Class G cement
210 g of silica flour

TABLE 2

Comparative example 3-1 to 3-8 according to US 2012/0095120 noninventive

| Reference | ACDMT/ mol % | Comonomer 1 Name | /mol % | Comonomer 2 Name | /mol % | Comonomer 3 Name | /mol % | Neutralizng agent Name | /g | Initiator Name | /g |
|---|---|---|---|---|---|---|---|---|---|---|---|
| VGP-3-1 | 45.0 | AA | 4.03 | AM | 32.5 | NVP | 18.48 | NaHCO$_3$ | 30 | DLP | 0.7 |
| VGP-3-2 | 55.1 | VPS | 2.44 | AM | 40.0 | NVF | 2.5 | NaHCO$_3$ | 27.5 | DLP | 0.7 |
| VGP-3-3 | 30.9 | AA | 6.0 | AM | 63.1 | — | — | NaHCO$_3$ | 54.7 | DLP | 0.7 |
| VGP-3-4 | 75.4 | VPS | 2.17 | AM | 20.2 | NVF | 2.3 | NaHCO$_3$ | 44.6 | DLP | 0.7 |
| VGP-3-5 | 21.7 | VPS | 1.13 | AM | 73.7 | NVF | 3.4 | NaHCO$_3$ | 15.8 | DLP | 0.7 |

ACDMT = acryloyldimethyltaurate,
VPS = vinylphosphonic acid,
NVP = N-vinyl-2-pyrrolidone,
AM = acrylamide,
NVF = N-vinylformamide,
DLP = dilauryl peroxide B) Cement Slurry Application Tests The testing is effected according to API spec. 10. In an atmospheric consistometer, the cement slurry is stirred/

328.8 g of distilled water
Polymer in the concentration specified in table 1
1.8 g of dispersant (polynaphthalenesulfonate, PNS)
1.8 g of retardant (lignosulfonate)

TABLE 3

(Application test at 250° F. (121° C.))

| Polymer from table 1 | Ammonia release in formulation | Conc./% by weight | Rheology after mixing at 80° F. (27° C.), scale divisions at X revolutions per minute Revolutions per minute/rpm | | | | | API fluid loss at 250° F./mL |
|---|---|---|---|---|---|---|---|---|
| | | | 300 | 200 | 100 | 6 | 3 | |
| Comparative polymer as per EP1045869 | Yes | 0.5 | 168 | 117 | 64 | 7.5 | 5.0 | 60 |
| Comparative polymer as per EP1045869 | Yes | 0.5 | 165 | 118 | 66 | 7 | 5.5 | 58 |

TABLE 3-continued (Application test at 250° F. (121° C.))

| Polymer from table 1 | Ammonia release in formulation | Conc./% by weight | Rheology after mixing at 80° F. (27° C.), scale divisions at X revolutions per minute Revolutions per minute/rpm | | | | | API fluid loss at 250° F./mL |
|---|---|---|---|---|---|---|---|---|
| | | | 300 | 200 | 100 | 6 | 3 | |
| Comparative polymer as per EP1045869 | Yes | 0.5 | 167 | 117 | 64 | 7.5 | 5.5 | 62 |
| VGP-3-1 as per US 2012/0095120 | No | 0.5 | 172 | 114 | 69 | 8 | 5 | 138 |
| VGP-3-2 as per US 2012/0095120 | No | 0.5 | 217 | 145 | 71 | 9 | 4 | 124 |
| VGP-3-3 as per US 2012/0095120 | No | 0.5 | 187 | 126 | 61 | 8 | 6 | 98 |
| VGP-3-4 as per US 2012/0095120 | No | 0.5 | 179 | 120 | 65 | 7 | 4 | 114 |
| VGP-3-5 as per US 2012/0095120 | No | 0.5 | 256 | 163 | 88 | 6 | 3 | 132 |
| Polymer C - 2 | No | 0.5 | 172 | 115 | 67 | 6.5 | 4 | 44 |
| Polymer C - 4 | No | 0.5 | 167 | 114 | 63 | 6.5 | 4 | 40 |
| Polymer C - 6 | No | 0.5 | 166 | 113 | 62 | 7 | 4.5 | 44 |
| Polymer C - 7 | No | 0.5 | 162 | 120 | 63 | 6.5 | 3.5 | 48 |
| Polymer C - 9 | No | 0.5 | 167 | 121 | 58 | 7.5 | 3.5 | 54 |
| Polymer C - 24 | No | 0.5 | 158 | 107 | 59 | 8 | 5 | 48 |
| Polymer C - 25 | No | 0.5 | 168 | 114 | 63 | 6.5 | 4 | 40 |
| Polymer C - 26 | No | 0.5 | 164 | 113 | 62 | 7 | 4.5 | 44 |
| Polymer C - 61 | No | 0.5 | 172 | 117 | 65 | 7 | 4.5 | 42 |
| Polymer C - 62 | No | 0.5 | 169 | 117 | 63 | 7 | 4.5 | 48 |
| Polymer C - 66 | No | 0.5 | 174 | 125 | 70 | 8 | 5 | 40 |
| Polymer C - 68 | No | 0.5 | 176 | 124 | 68 | 7 | 4 | 44 |
| Polymer C - 69 | No | 0.5 | 168 | 122 | 63 | 6.5 | 3.5 | 48 |
| Polymer C - 76 | No | 0.5 | 153 | 116 | 58 | 7.5 | 4 | 46 |

As shown by the comparison of the inventive examples in table 3 with the comparative examples VGP-2, VGP-3-1 to VGP-3-5, the process of the invention that utilizes a solvent mixture gives a product which differs from products that have been obtained with just one solvent according to the prior art. The products obtained by the process of the invention show lower water loss when they are used as additive in cement slurries and drilling mud.

C) Drilling Mud Application Tests

In the examples which follow, the polymers C are compared with comparative polymer 2 from EP 10033378, known from the prior art, in a barite-weighted seawater drilling mud with 3% KCl and a specific weight of 2.1 kg/L. Prior to use, a drilling mud is adjusted with sodium hydroxide to a pH of 9-11. The amount used in each case was 2.5% by weight.

The quality of the mud and hence the efficacy of the additives is assessed by the following criteria:

a) Fluid loss after 30 minutes in an HTHP filter press at 150° C. and a pressure of 500 psi (35 bar) after dynamic ageing of the mud in a roller oven at 130, 150, 170, 185 and 200° C. for 16 h or 66 h.

b) Rheology (plastic viscosity [PV], yield point [YP], gel strengths [Gel st.] after 10 seconds [10"] and 10 minutes [10']), measured in a Fann-35 rotary viscometer after makeup, and also dynamic ageing in a roller oven at 130, 150, 170, 185 and 200° C. for 16 h or 66 h.

The following additives were used for the studies:

a) comparative polymer 2
b) VGP-3-1 (from table 2)
c) VGP-3-2 (from table 2)
d) VGP-3-3 (from table 2)
e) polymer C-31 (from table 1)
g) polymer C-62 (from table 1)
h) polymer C-5 (from table 1)
j) polymer C-21 (from table 1)

TABLE 4

| | | Ageing/h | | | | | |
|---|---|---|---|---|---|---|---|
| | | before | 16 | 16 | 16 | 66 | 16 |
| | | | Temperature/° C. | | | | |
| Polymer | | | 130 | 150 | 170 | 170 | 200 |
| Comparative polymer 2 as per EP1045869 | Fluid loss/mL | | 44 | 46 | 22 | 19 | 27 |
| | PV (cp) | 76 | 85 | 74 | 83 | 74 | 56 |
| | YP/lb/100 ft² | 27 | 31 | 34 | 22 | 8 | 6 |
| | 10" gel st. | 5 | 8 | 9 | 7 | 3.5 | 5 |
| | 10' gel st. | 12 | 14 | 12 | 10 | 6 | 5 |
| VGP-3-1 as per US 2012/0095120 | Fluid loss/mL | | 77 | 80 | 75 | 103 | 105 |
| | PV (cp) | 97 | 109 | 102 | 89 | 74 | 71 |
| | YP/lb/100 ft² | 21 | 14 | 15 | 10 | 5 | 8 |

TABLE 4-continued

| Polymer | | before | 16 / 130 | 16 / 150 | 16 / 170 | 66 / 170 | 16 / 200 |
|---|---|---|---|---|---|---|---|
| | 10" gel st. | 11 | 18 | 18 | 13 | 9 | 7 |
| | 10' gel st. | 18 | 25 | 27 | 24 | 19 | 17 |
| VGP-3-2 as per US 2012/0095120 | Fluid loss/mL | | 58 | 34 | 38 | 43 | 41 |
| | PV (cp) | 63 | 71 | 90 | 82 | 69 | 49 |
| | YP/lb/100 ft² | 21 | 28 | 42 | 29 | 9 | 8 |
| | 10" gel st. | 12 | 11 | 13 | 11 | 5 | 4 |
| | 10' gel st. | 14 | 15 | 17 | 17 | 6 | 6 |
| VGP-3-3 as per US 2012/0095120 | Fluid loss/mL | | 66 | 69 | 64 | 92 | 94 |
| | PV (cp) | 103 | 93 | 89 | 78 | 64 | 71 |
| | YP/lb/100 ft² | 20 | 15 | 14 | 9 | 6 | 8 |
| | 10" gel st. | 10 | 15 | 15 | 11 | 7 | 5 |
| | 10' gel st. | 15 | 22 | 20 | 14 | 9 | 5 |
| Polymer C-5 | Fluid loss/mL | | 42 | 43 | 20 | 21 | 24 |
| | PV (cp) | 83 | 87 | 79 | 80 | 76 | 58 |
| | YP/lb/100 ft² | 25 | 33 | 31 | 26 | 9 | 6.5 |
| | 10" gel st. | 7 | 8 | 9 | 8 | 3.5 | 6 |
| | 10' gel st. | 12 | 13 | 13 | 11 | 6 | 5.5 |
| Polymer C-21 | Fluid loss/mL | | 41 | 48 | 29 | 31 | 34 |
| | PV (cp) | 75 | 84 | 79 | 84 | 73 | 61 |
| | YP/lb/100 ft² | 27 | 29 | 31 | 26 | 9 | 6.5 |
| | 10" gel st. | 8 | 7 | 9 | 7 | 4.5 | 6 |
| | 10' gel st. | 14 | 16 | 15 | 13 | 7 | 6 |
| Polymer C-31 | Fluid loss/mL | | 20 | 16 | 17 | 18 | 19 |
| | PV (cp) | 68 | 75 | 73 | 77 | 63 | 51 |
| | YP/lb/100 ft² | 23 | 26 | 22 | 19 | 18 | 16 |
| | 10" gel st. | 7 | 8 | 8 | 8 | 5 | 5 |
| | 10' gel st. | 12 | 15 | 15 | 13 | 7 | 6 |
| Polymer C-62 | Fluid loss/mL | | 27 | 19 | 23 | 23 | 25 |
| | PV (cp) | 65 | 64 | 71 | 64 | 59 | 48 |
| | YP/lb/100 ft² | 27 | 32 | 27 | 24 | 14 | 16 |
| | 10" gel st. | 9 | 8 | 9 | 13 | 5 | 5 |
| | 10' gel st. | 12 | 11 | 13 | 17 | 6.5 | 6 |

The test results show comparable values to comparative example 2, with regard to the uniform rheological properties of the drilling mud after makeup and after ageing over the temperature range from 130 to 200° C. The polymers C have a broad temperature range with regard to their efficacy as a fluid loss additive.

As shown by the comparison of the inventive examples in table 4 with the comparative examples VGP-2, VGP-3-1 to VGP-3-4, the process of the invention that utilizes a solvent mixture gives a product which differs from products which have been obtained with just one solvent according to the prior art. The products obtained by the process of the invention show a lower water loss when used as additive in cement slurries and drilling mud.

D) Comparison to WO 2010/108634

A comparison of the copolymers of the invention with those from examples 4 and 6 from WO 2010/108634 was conducted.

General polymerization method for preparation of the polymers by the precipitation process in tert-butanol according to WO 2010/108634

A 1 liter Quickfit flask with reflux condenser, gas inlet, internal thermometer and stirrer is initially charged with 400 g of tert-butanol, and the calculated amount of 2-acrylamido-2-methyl-1-propanesulfonic acid (AMPS®, Lubrizol) is added. Subsequently, the addition of the equimolar amount of sodium hydroxide or sodium carbonate is neutralized (target pH 6-7) and the calculated amount of 2-carboxyethyl acrylate or 2-carboxyethyl acrylate oligomer mixture (Bimax Chemicals Ltd.) and the calculated amount of crosslinker are added to the reaction mixture. Should the pH of the reaction mixture have drifted into the acidic range after the addition of comonomer, it is neutralized again by further addition of sodium hydroxide or sodium carbonate (target pH 6-7). After the mixture has been inertized with $N_2$ or argon, at an internal temperature of 60° C., dimethyl 2,2'-azobisisobutyrate (V-601) is added as initiator and the polymerization reaction is initiated. After a few minutes, there is precipitation of the finished polymer. The mixture is heated to reflux for two hours and the polymer is then freed of the solvent by means of a suction filter and dried under reduced pressure. This method is generally applicable to all polymerization reactions described hereinafter in table 1. Examples 1 to 6 from WO 2010/108634 were prepared with the aid of this method. The results obtained were as follows:

TABLE 5

Comparative examples 4 to 6 according to WO 2010/108634

| Reference | ACDMT/ mol % | Comonomer 1 Name | /mol % | Comonomer 2 Name | /mol % | Comonomer 3 Name | /mol % | Neutralizing agent Name | /g | Initiator Name | /g | k value |
|---|---|---|---|---|---|---|---|---|---|---|---|---|
| Comparison D2-1 | 85.5 | CEA-oligo | 10 | DMAAm | 4 | PEAS | 0.5 | NaOH | 19.4 | V601 | 1.1 | 106 |
| Comparison D2-2 | 85.5 | CEA-oligo | 10 | DMAAm | 4 | PEAS | 0.5 | Na$_2$CO$_3$ | 25.7 | V601 | 1.1 | 118 |
| Comparison D2-3 | 44.5 | CEA | 15 | DMAAm | 40 | TMPTA | 0.5 | NaOH | 18.4 | DLP | 1.7 | 134 |
| Comparison D2-4 | 44.5 | CEA | 15 | DMAAm | 40 | TMPTA | 0.5 | Na$_2$CO$_3$ | 24.4 | DLP | 1.7 | 137 |
| Comparison D2-5 | 79.5 | CEA-oligo | 10 | DMAAm | 10 | PEAS | 0.5 | NaOH | 12.7 | V601 | 1.3 | 116 |
| Comparison D2-6 | 79.5 | CEA-oligo | 10 | DMAAm | 10 | PEAS | 0.5 | Na$_2$CO$_3$ | 28.8 | V601 | 1.3 | 125 |

ACDMT = acryloyldimethyltaurate,
CEA-oligo = carboxyethyl acrylate oligomer mixture,
CEA = carboxyethyl acrylate,
DMAAm = Dimethylacrylamide,
TMPTA = trimethylolpropane triacrylate,
PEAS = pentaerythritol diacrylate monostearate,
V601 = dimethyl 2,2'-azobisisobutyrate,
DLP = dilauryl peroxide Cement Slurry Application Tests The testing is effected according to API spec. 10. In an atmospheric consistometer, the cement slurry is stirred/conditioned at the study temperature and then at the same temperature the rheology with the FANN model 35SA viscometer (in the case of high temperature, conditioning is effected at 93° C. and the viscosity is measured). At temperatures >93° C., water loss is measured with a stirring fluid loss apparatus (SFLA).

Table 6 shows the water loss-reducing properties of selected abovementioned examples according to API spec. 10 at 121.1° C. (250° F.) in the stirred filtration test in the Fann HTHP filter press (stirring fluid loss apparatus, SFLA). Formulation of the cement slurries for an application at 250° F., about 121° C.:
100 g of Dyckerhoff Class G cement
g of silica flour
54.8 g of distilled water
Polymer in the in Table 5a) to 5c) in the Specified Concentration
0.3 g of dispersant (polynaphthalenesulfonate, PNS)
0.5 g of retardant (lignosulfonate)

TABLE 6

(Application test at 250° F. (121° C.))

| Polymer from table 5a) to 5c) | Concentration/ % by weight | Rheology after mixing at 80° F. (27° C.), scale divisions at X revolutions per minute Revolutions per minute/rpm | | | | | API fluid loss at 250° F./mL |
|---|---|---|---|---|---|---|---|
| | | 300 | 200 | 100 | 6 | 3 | |
| Comparison D2-1 | 0.5 | 171 | 128 | 62 | 7 | 4.5 | 93 |
| Comparison D2-2 | 0.5 | 195 | 133 | 64 | 7.5 | 3.5 | 87 |
| Comparison D2-3 | 0.5 | 183 | 116 | 57 | 6.5 | 3.5 | >100 |
| Comparison D2-4 | 0.5 | 201 | 139 | 69 | 7 | 4 | >100 |
| Comparison D2-5 | 0.5 | 177 | 118 | 63 | 7 | 4 | >100 |
| Comparison D2-6 | 0.5 | 182 | 124 | 58 | 6.5 | 3.5 | >100 |

Then a polymer of the same composition was produced according to the inventive process example 2.

TABLE 7

Comparative examples 4 to 6 according to WO 2010/108634 synthesized by the inventive process example 2

| Reference | ACDMT/ mol % | Comonomer 1 Name | /mol % | Comonomer 2 Name | /mol % | Comonomer 3 Name | /mol % | Neutralizing agent Name | /g | Initiator Name | /g | k value |
|---|---|---|---|---|---|---|---|---|---|---|---|---|
| Polymer C - 77 | 85.5 | CEA-oligo | 10 | DMAAm | 4 | PEAS | 0.5 | NaHCO$_3$ | 41 | V601 | 1.1 | 216 |
| Polymer C - 78 | 44.5 | CEA | 15 | DMAAm | 40 | TMPTA | 0.5 | NaHCO$_3$ | 39 | DLP | 1.7 | 240 |
| Polymer C - 79 | 79.5 | CEA-oligo | 10 | DMAAm | 10 | PEAS | 0.5 | NaHCO$_3$ | 41 | V601 | 1.3 | 238 |

ACDMT = acryloyldimethyltaurate,
CEA-oligo = carboxyethyl acrylate oligomer mixture,
CEA = carboxyethyl acrylate,
DMAAm = dimethylacrylamide,
TMPTA = trimethylolpropane triacrylate,
PEAS = pentaerythritol diacrylate monostearate,
V601 = dimethyl 2,2'-azobisisobutyrate,
DLP = dilauryl peroxide

TABLE 8

(Application test at 250° F. (121° C.))

| Polymer from table 5a) to 5c) | Concentration/ % by weight | Rheology after mixing at 80° F. (27° C.), scale divisions at X revolutions per minute Revolutions per minute/rpm | | | | | API fluid loss at 250° F./mL |
|---|---|---|---|---|---|---|---|
| | | 300 | 200 | 100 | 6 | 3 | |
| Polymer C - 77 | 0.5 | 159 | 115 | 69 | 7 | 4. | 64 |
| Polymer C - 78 | 0.5 | 172 | 122 | 84 | 8 | 5 | 70 |
| Polymer C - 79 | 0.5 | 153 | 111 | 53 | 6.5 | 4.5 | 88 |

Comparative examples D2-1 to D2-6 also showed a much lower K value than the polymers having the identical composition according to inventive process example 2 (polymer C-77 to C-79). This suggests incomplete polymerization, since the sodium salt was only of limited to zero solubility in the solvent mixture of the process described in WO2010/108634 and hence was not available for the polymerization. For testing of the polymers obtained, these were used as water loss reducers in cement slurries. The use of sodium hydroxide and sodium carbonate did not result in any release of ammonia, but comparative examples D2-1 to D2-6, by contrast with the polymers (polymer C-77 to C-79) of the process of the invention, also showed a much poorer "API fluid loss at 250° F.". This shows clearly that, by the described process according to WO2010/108634, polymers of sodium salts of acryloyldimethyltaurate are obtainable, but comparative examples D2-1 to D2-6 showed that these polymers are not suitable water loss reducers.

Application Tests

E) Comparison to EP 1059316

A comparison of the copolymers of the invention with those of polymer examples 4 to 6 from EP 1059316 was conducted.

Comparative Example D1-1

General polymerization method for preparation of polymers 4 to 5 by the polymerization process in aqueous solution according to EP 1059316

A polymerization flask of capacity 2 L, equipped with stirrer, reflux condenser, dropping funnel, gas inlet tube and electrically heated water bath, is initially charged with 121.4 mL of deionized water and 1.6 g of 65% vinylphosphonic acid, and purged with nitrogen, and aqueous 22% ammonia solution is added until a pH of 7-7.5 has been attained. This solution is then heated to 60° C.

A monomer/initiator solution consisting of 290 g of deionized water, 72.6 g of ACDMT, 29.1 g of 50% acrylamide, 10.4 g of N-vinylformamide, 5.2 of 60% DADMAC, 2.1 g of acrylic acid, 0.5 mL of isopropanol, 0.51 g=2,2'-azobis(2-methylpropionamidine) dihydrochloride and the amount of aqueous 22% ammonia solution required to establish a pH of 7.0 to 7.5 is prepared. 10% (about 45 mL) of the monomer/initiator solution is introduced into the polymerization flask. The mixture is stirred at 60° C. until polymerization sets in (about 30 min). Then the residual monomer/initiator solution is metered in at constant metering rate over a period of 2.5 hours. Heating is continued at 80° C. for another 2 hours. A clear solution of high viscosity is obtained, which can be sent directly to use as a drilling mud additive or as an additive to cement slurries.

This method is generally applicable to all polymerization reactions described hereinafter in table 9. Examples 4 to 6 from EP 1059316 were prepared with the aid of this method. The results obtained were as follows:

TABLE 9

Comparative examples 4 to 6 according to EP 1059316

| Comparative polymer | ACDMT/ mol % | VPS/ mol % | AM/ mol % | AA/ mol % | NVF/ mol % | Comonomer Name | /mol % | Initiator Name | /g |
|---|---|---|---|---|---|---|---|---|---|
| D1-1 | 41.3 | 1.1 | 24.1 | 12.4 | 17.2 | DADMAC | 3.9 | AAPH | 0.51 |
| D1-2 | 42.4 | 1.2 | 24.2 | 12.8 | 17.7 | AMPT | 1.7 | AAPH | 0.51 |
| D1-3 | 53.2 | 1.3 | 7.8 | 15.9 | 19.3 | DADMAC | 2.5 | AAPH | 0.51 |

ACDMT = acryloyldimethyltaurate,
VPS = vinylphosphonic acid,
AM = acrylamide,
NVF = N-vinylformamide,
AA = acrylic acid,
DADMAC = diallyldimethylammonium chloride,
AMPT = 3-acrylamidopropyltrimethylammonium chloride,
AAPH = 2,2'-azobis(2-methylpropionamidine) dihydrochloride Note relating to the continuous aqueous polymerization process described in EP 1059316:

The continuous aqueous polymerization process described in EP 1059316 initially charges a monomer (vinylphosphonic acid) in a polymerization flask and subsequently meters in a monomer/initiator solution. Proceeding from the copolymerization parameters for vinylphosphonic acid with the individual monomers in the monomer/initiator solution, it is clearly apparent to the person skilled in the art that, at the start of the polymerization, polymers with a higher vinylphosphonic acid content will arise than at the end of the polymerization. It can even be assumed that the polymers synthesized at the end of the polymerization will now contain virtually no vinylphosphonic acid. Instead, a mixture of copolymers with different compositions is obtained, and so the molar ratios reported in table 7 relate solely to the monomer ratios used. These polymers are not comparable with the polymers from the process of the invention.

Cement Slurry Application Tests

The testing is effected according to API spec. 10. In an atmospheric consistometer, the cement slurry is stirred/conditioned at the study temperature and then at the same temperature the rheology with the FANN model 35SA viscometer (in the case of high temperature, conditioning is effected at 93° C. and the viscosity is measured). At temperatures >93° C., water loss is measured with a stirring fluid loss apparatus (SFLA).

Table 10 shows the water loss-reducing properties of selected abovementioned examples according to API spec. 10 at 121.1° C. (250° F.) in the stirred filtration test in the Fann HTHP filter press (stirring fluid loss apparatus, SFLA).

Formulation of the cement slurries for an application at 250° F., about 121° C.:
100 g of Dyckerhoff Class G Cement
g of silica flour
54.8 g of distilled water
Polymers D1-1 to D1-3 in the Concentration Specified
0.3 g of dispersant (polynaphthalenesulfonate, PNS)
0.5 g of retardant (lignosulfonate)

TABLE 10

(Application test at 250° F. (121° C.))

| Polymer from table 9 | Ammonia release in formulation | Concentration/ % by weight | Rheology after mixing at 80° F. (27° C.), scale divisions at X revolutions per minute Revolutions per minute/rpm | | | | | API fluid loss at 250° F./mL |
|---|---|---|---|---|---|---|---|---|
| | | | 300 | 200 | 100 | 6 | 3 | |
| D1-1 | Yes | 0.5 | 104 | 68 | 31 | 4-5 | 3 | >100 |
| D1-2 | Yes | 0.5 | 112 | 74 | 29 | 4-5 | 3 | >100 |
| D1-3 | Yes | 0.5 | 98 | 75 | 34 | 4-5 | 3.5 | >100 |

Then polymers of the same composition were prepared by the inventive process example 7.

TABLE 11

Comparative examples 4 to 6 according to WO 2010/108634, synthesized according to inventive process example 7

| Reference | ACDMT/ mol % | VPS/ mol % | AM/ mol % | AA/ mol % | NVF/ mol % | Comonomer Name | /mol % | Neutralizing agent Name | /g | Initiator Name | /g | k value |
|---|---|---|---|---|---|---|---|---|---|---|---|---|
| Polymer C - 80 | 41.3 | 1.1 | 24.1 | 12.4 | 17.2 | DADMAC | 3.9 | NaHCO$_3$ | 39.1 | AIBN | 1.1 | 211 |
| Polymer C - 81 | 42.4 | 1.2 | 24.2 | 12.8 | 17.7 | AMPT | 1.7 | NaHCO$_3$ | 39.2 | AIBN | 1.0 | 219 |
| Polymer C - 82 | 53.2 | 1.3 | 7.8 | 15.9 | 19.3 | DADMAC | 2.5 | NaHCO$_3$ | 39.1 | AIBN | 1.0 | 204 |

TABLE 12

(Application test at 250° F. (121° C.))

| Polymer from table 11 | Concentration/ % by weight | Rheology after mixing at 80° F. (27° C.), scale divisions at X revolutions per minute Revolutions per minute/rpm | | | | | API fluid loss at 250° F./mL |
|---|---|---|---|---|---|---|---|
| | | 300 | 200 | 100 | 6 | 3 | |
| Polymer C - 80 | 0.5 | 184 | 125 | 81 | 8 | 4.5 | 74 |
| Polymer C - 81 | 0.5 | 169 | 119 | 63 | 7 | 4 | 88 |
| Polymer C - 82 | 0.5 | 175 | 132 | 74 | 8 | 4.5 | 76 |

The use of the aqueous ammonia solution during the synthesis of comparative examples D1-1 to D1-3, as a result of the alkaline composition of the cement formulation, leads to release of ammonia gas during the addition of the polymer solutions. Direct comparison of comparative examples D1-1 to D1-3 with the polymers of identical composition according to inventive process example 7 (Polymer C-80 to C-82) shows a much poorer "API fluid loss at 250° F." for the comparative polymers. The comparisons show very clearly that the polymers according to the continuous aqueous polymerization process described in EP 1059316 do have the same composition as in the process of the invention, but the polymers of the process of the invention feature much better performance.

The invention claimed is:

1. A process for preparing a water-soluble or water-swellable polymer containing
   a) 5 to 79.99 mol %, of at least one repeat structural unit of the formula (1)

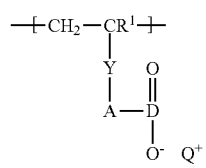

(1)

in which
   R$^1$, R$^2$, R$^3$ is hydrogen, methyl or ethyl,
   Y is a chemical bond, O, CH$_2$, C(CH$_3$)H, C(O)O, C(O), C(O)NR$^2$,
   A is a chemical bond, O, arylene, phenylene, linear or branched C$_1$-C$_{12}$-alkylene, a linear monohydroxyalkylene group having 2 to 6 carbon atoms or a linear or branched dihydroxyalkylene group having 3 to 6 carbon atoms,
   D is S(O), POH, POR$^3$ or PO$^-$Q$^+$,
   Q$^+$ is H$^+$, Li$^+$, Na$^+$, K$^+$, ½ Ca$^{++}$, ½ Mg$^{++}$, ½ Zn$^{++}$, ⅓ Al$^{+++}$, ¼ Zr$^{++++}$ or is mixtures of these ions, b) 20 to 75 mol %, of at least one mutually independent uncharged repeat structural unit, and
   c) 0.01 to 20 mol %, of at least one further anionic repeat structural unit that have originated from at least one monomer having at least one carboxylate group,
   wherein the process comprises the step of subjecting monomers from which the structural units a) to c) derive to precipitative free-radical polymerization in a polar solvent or solvent mixture, wherein the polar solvent or solvent mixture comprises water, 2-methylpropan-2-ol and dimethyl ketone, with the proviso that the water content of the solvent does not exceed 10% by weight.

2. The process as claimed in claim 1, wherein the structural unit of the formula (1) are derived from monomers selected from the group consisting of acryloyldimethyltaurate, acryloyl-1,1-dimethyl-2-methyltaurate, acryloyltaurate, acryloyl-N-methyltaurate, vinylsulfonic acid, styrenesulfonic acid, 3-allyloxy-2-hydroxy-1-propanesulfonic acid, vinylphosphonic acid, and 2-acrylamido-2-methylpropanephosphonic acid.

3. The process as claimed in claim 1, wherein the neutralization level of the structural unit of the formula (1) is from 50.0 to 100 mol %.

4. The process as claimed in claim 1, wherein the structural unit b) is at least one monomer selected from the group consisting of N-vinylformamide, N-vinylacetamide, N-methyl-N-vinylformamide, N-methyl-N-vinylacetamide, N-vinyl-2-pyrrolidone, N-vinylcaprolactam, vinyl acetate, N,N-dimethylacrylamide, N-isopropylacrylamide, acrylamide, and methyl acrylate.

5. The process as claimed in claim 1, wherein the structural unit c) derive from monomers of the formula (5)

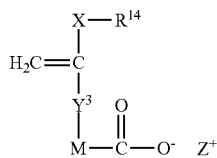 (5)

where
R$^{14}$, R$^{15}$ is hydrogen, methyl or ethyl, C(O)O$^-$ Z$^+$,
X, Y$^3$ is a chemical bond, O, CH$_2$, C(O)O, OC(O), C(O)NR$^{15}$ or NR$^{15}$C(O),
M is a chemical bond, —[C(O)O—CH$_2$—CH$_2$]$_q$—, a linear or branched alkylene group having 1 to 6 carbon atoms, a linear or branched, mono- or polyunsaturated alkenylene group having 2 to 6 carbon atoms, a linear monohydroxyalkylene group having 2 to 6 carbon atoms or a linear or branched dihydroxyalkylene group having 3 to 6 carbon atoms,
q is an integer from 1-5 and
Z+ is H+, Li+, Na+, K+, Zr+, ½ Ca++, ½ Mg++, ½ Zn++, ⅓ Al+++, ¼ Zr++++ or is mixtures of these ions.

6. The process as claimed in claim 1, wherein the structural unit c) is derived from at least one monomer selected from the group consisting of acrylic acid, methacrylic acid, itaconic acid, carboxyethyl acrylate, carboxyethyl acrylate oligomers, 2-propylacrylic acid and 2-ethylacrylic acid and the respective alkali metal or alkaline earth metal salts thereof.

7. The process as claimed in claim 1, wherein the monomers from which the structural units of components a) and c) derive are neutralized prior to the polymerization, or the polymer is neutralized after the polymerization, with a base selected from the group consisting of sodium hydrogencarbonate, sodium carbonate, sodium hydroxide, potassium hydrogencarbonate, potassium carbonate, potassium hydroxide, lithium hydrogencarbonate, lithium carbonate, lithium hydroxide, calcium hydrogencarbonate, and calcium carbonate.

8. The process as claimed in claim 1, wherein the solvent comprises at least one polar organic solvent selected from the group consisting of methanol, ethanol, 1-propanol, 2-propanol, 2-methyl-2-propanol, 1-butanol, 2-butanol, dimethyl ketone, diethyl ketone, tetrahydropyran, tetrahydrofuran, 2-methyltetrahydrofuran, 1,3-dioxane, 1,4-dioxane, and mixtures thereof.

9. The process as claimed in claim 1, wherein the polar solvent comprises 0.5% to 10% by weight of water, 1% to 98.5% by weight of 2-methylpropan-2-ol and 1% to 98.5% by weight of dimethyl ketone.

10. The process as claimed in claim 1, wherein the polar solvent comprises 1% to 5% by weight of water, 7.5% to 91.5% by weight of 2-methylpropan-2-ol and 7.5% to 91.5% by weight of dimethyl ketone.

11. The process as claimed in claim 1, wherein the polar solvent is separated from the product after the polymerization process by a filtration or distillation.

12. A water-soluble or water-swellable polymer prepared by the process as claimed in claim 1, wherein the water-soluble or water-swellable polymer has a k value of 100 to 300.

13. A drilling mud comprising at least one water-soluble or water-swellable polymer as claimed in claim 12.

14. A cement slurry for cementing a deep well, comprising at least one water-soluble or water-swellable polymer as claimed in claim 12.

* * * * *